(12) United States Patent
Hartzell et al.

(10) Patent No.: US 7,090,904 B2
(45) Date of Patent: *Aug. 15, 2006

(54) ENHANCED SLIDER ZIPPER MULTIWALL BAG AND ASSOCIATED METHODS

(75) Inventors: Mark Hartzell, Bloomsburg, PA (US); Alfred A. McLellan, Inman, SC (US); Sarajane Johnson, Simpsonville, SC (US); Roseann Woodham-Grant, Greenville, SC (US); Lesley M. Millslagle, Roebuck, SC (US); Mary K. Cash, Wellford, SC (US)

(73) Assignee: Exopack, L.L.C., Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/860,366

(22) Filed: Jun. 3, 2004

(65) Prior Publication Data

US 2004/0228547 A1 Nov. 18, 2004

Related U.S. Application Data

(63) Continuation-in-part of application No. 10/290,681, filed on Nov. 8, 2002.
n

(51) Int. Cl.
*B29D 22/00* (2006.01)
*B29D 23/00* (2006.01)
*B32B 1/08* (2006.01)

(52) U.S. Cl. ............... 428/34.3; 428/35.7; 428/36.91; 383/61.2; 383/61.3; 383/120

(58) Field of Classification Search ............... 428/34.3, 428/35.7, 36.9, 36.91; 383/61.2, 61.3, 109, 383/119, 120
See application file for complete search history.

(56) References Cited

U.S. PATENT DOCUMENTS

| | | | |
|---|---|---|---|
| 3,085,738 A | 4/1963 | Bok |
| 3,181,583 A | 5/1965 | Lingenfelter |
| 3,226,787 A | 1/1966 | Ausnit |
| 3,473,589 A | 10/1969 | Gotz |
| 3,473,725 A | 10/1969 | Wiehahn |
| 3,746,215 A | 7/1973 | Ausnit et al. |
| 3,827,472 A | 8/1974 | Uramoto |
| 3,839,128 A | 10/1974 | Arai |
| 3,939,972 A | 2/1976 | Mayworm |
| 3,948,705 A | 4/1976 | Ausnit |
| 3,958,749 A | 5/1976 | Goodrich |
| 3,991,801 A | 11/1976 | Ausnit |
| 4,094,729 A | 6/1978 | Boccia |
| 4,176,746 A | 12/1979 | Kooi |

(Continued)

FOREIGN PATENT DOCUMENTS

JP 10166477 A * 6/1998

*Primary Examiner*—Michael Miggins
(74) *Attorney, Agent, or Firm*—Stoel Rives LLP

(57) ABSTRACT

A multiwall bag having a slider zipper and fin combination and methods of forming same are provided. The multiwall bag, for example, can include a tube body. A combination fin member, zipper track, and zipper block can be connected to an end of the tube body. The other end of the tube body can be filled with product so that the combination fin member, zipper track, and zipper block operate as a constructive bottom during filling. Then, the end of the tube body through which product is filled can be closed and sealed to provide a bag filled with product. The method can include forming a tube body and connecting a combination fin member, zipper track, and zipper block to the bag seal zone.

50 Claims, 12 Drawing Sheets

U.S. PATENT DOCUMENTS

| | | |
|---|---|---|
| 4,191,230 A | 3/1980 | Ausnit |
| 4,241,865 A | 12/1980 | Ferrell |
| 4,285,376 A | 8/1981 | Ausnit |
| 4,493,127 A | 1/1985 | Blanke |
| 4,617,683 A | 10/1986 | Christoff |
| 4,637,063 A | 1/1987 | Sullivan et al. |
| 4,691,372 A | 9/1987 | Van Erden |
| 4,703,518 A | 10/1987 | Ausnit |
| 4,756,629 A | 7/1988 | Tilman et al. |
| 4,946,289 A | 8/1990 | Bolling |
| 4,952,441 A | 8/1990 | Bose |
| 4,971,454 A | 11/1990 | Branson et al. |
| 4,994,324 A | 2/1991 | Bose |
| 5,038,009 A | 8/1991 | Babbitt |
| 5,051,284 A | 9/1991 | Johansson et al. |
| 5,171,594 A | 12/1992 | Babbitt |
| 5,205,650 A | 4/1993 | Rasmussen |
| 5,345,399 A | 9/1994 | Collins |
| 5,482,376 A | 1/1996 | Moseley |
| 5,488,220 A | 1/1996 | Freerks |
| 5,529,396 A | 6/1996 | Pryor |
| 5,558,438 A | 9/1996 | Warr |
| 5,560,296 A | 10/1996 | Adams |
| 5,593,229 A | 1/1997 | Warr |
| 5,601,369 A | 2/1997 | Moseley |
| 5,611,626 A | 3/1997 | Warr |
| 5,728,037 A | 3/1998 | Pryor |
| 5,770,839 A | 6/1998 | Ruebush |
| 5,871,790 A | 2/1999 | Monier |
| 5,919,535 A | 7/1999 | Dobreski et al. |
| 6,010,244 A | 1/2000 | Dobreski et al. |
| 6,019,713 A | 2/2000 | Scypinski |
| 6,046,443 A | 4/2000 | Ackerman |
| 6,065,871 A | 5/2000 | Warr |
| 6,213,644 B1 | 4/2001 | Henderson |
| 6,231,232 B1 | 5/2001 | Warr |
| 6,257,763 B1 | 7/2001 | Stolmeier et al. |
| 6,286,999 B1 | 9/2001 | Cappel et al. |
| 6,299,351 B1 | 10/2001 | Warr |
| 6,367,976 B1 | 4/2002 | Bannister |
| 6,374,461 B1 | 4/2002 | Gober |
| 6,376,035 B1 | 4/2002 | Dobreski et al. |
| 6,402,375 B1 | 6/2002 | Schreiter et al. |
| 6,402,379 B1 | 6/2002 | Albright |
| 6,439,770 B1 | 8/2002 | Catchman |
| 6,609,999 B1 | 8/2003 | Albright |
| 6,799,890 B1 | 10/2004 | Schneider et al. |
| 6,893,686 B1 | 5/2005 | Egan |
| 2003/0044093 A1 | 3/2003 | Schneider et al. |
| 2004/0038792 A1 | 2/2004 | Albright |
| 2004/0091648 A1 | 5/2004 | Hartzell et al. |
| 2004/0120613 A1 | 6/2004 | Hanson |
| 2004/0136616 A1 | 7/2004 | Allen et al. |
| 2004/0137206 A1 | 7/2004 | Pettis |
| 2004/0175060 A1 | 9/2004 | Woodham et al. |
| 2004/0179753 A1 | 9/2004 | Schneider et al. |
| 2004/0228547 A1 | 11/2004 | Hartzell et al. |
| 2005/0008266 A1 | 1/2005 | Crunkleton et al. |
| 2005/0008267 A1 | 1/2005 | Linton et al. |
| 2005/0008736 A1 | 1/2005 | Egan |

\* cited by examiner

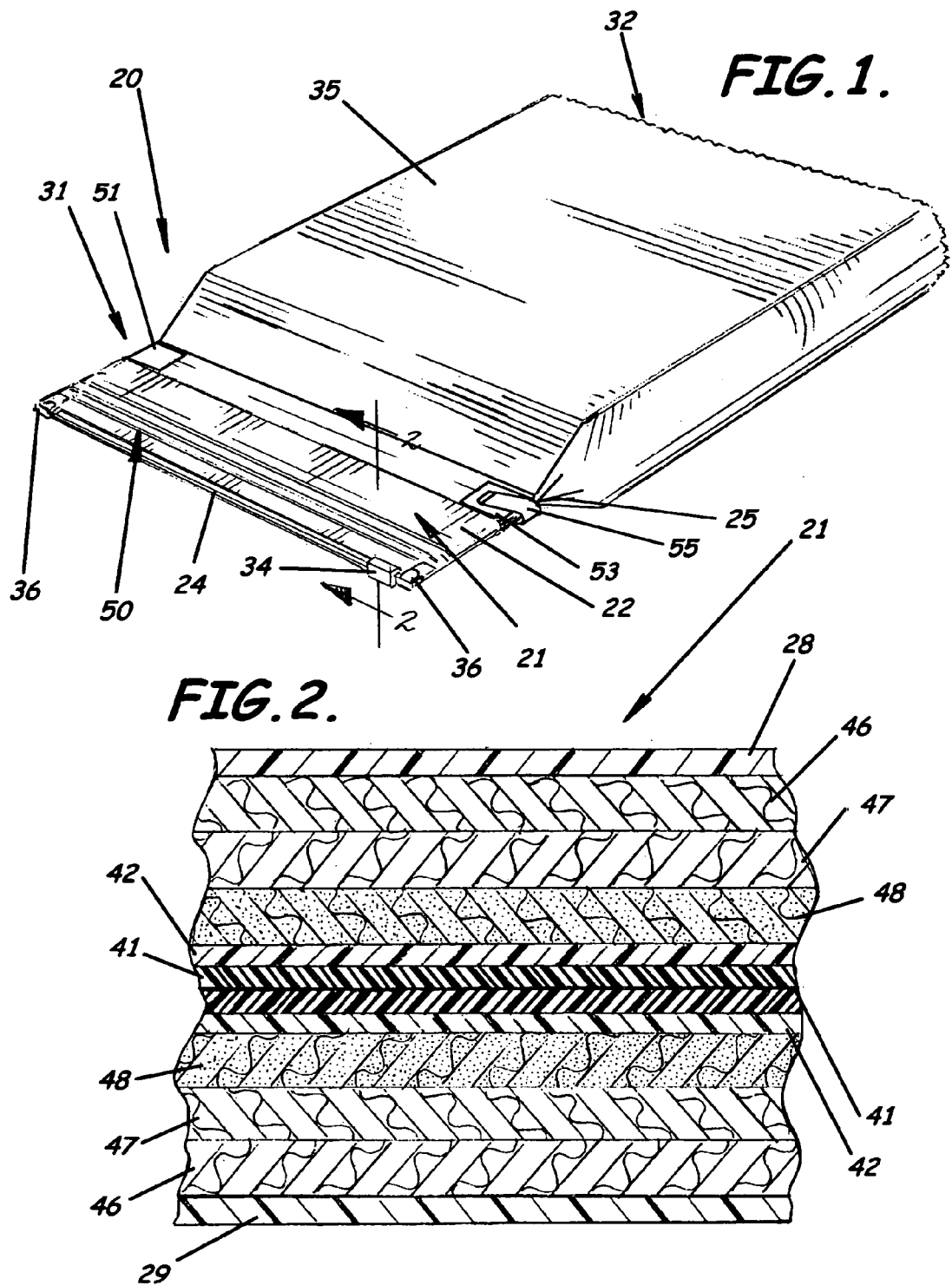

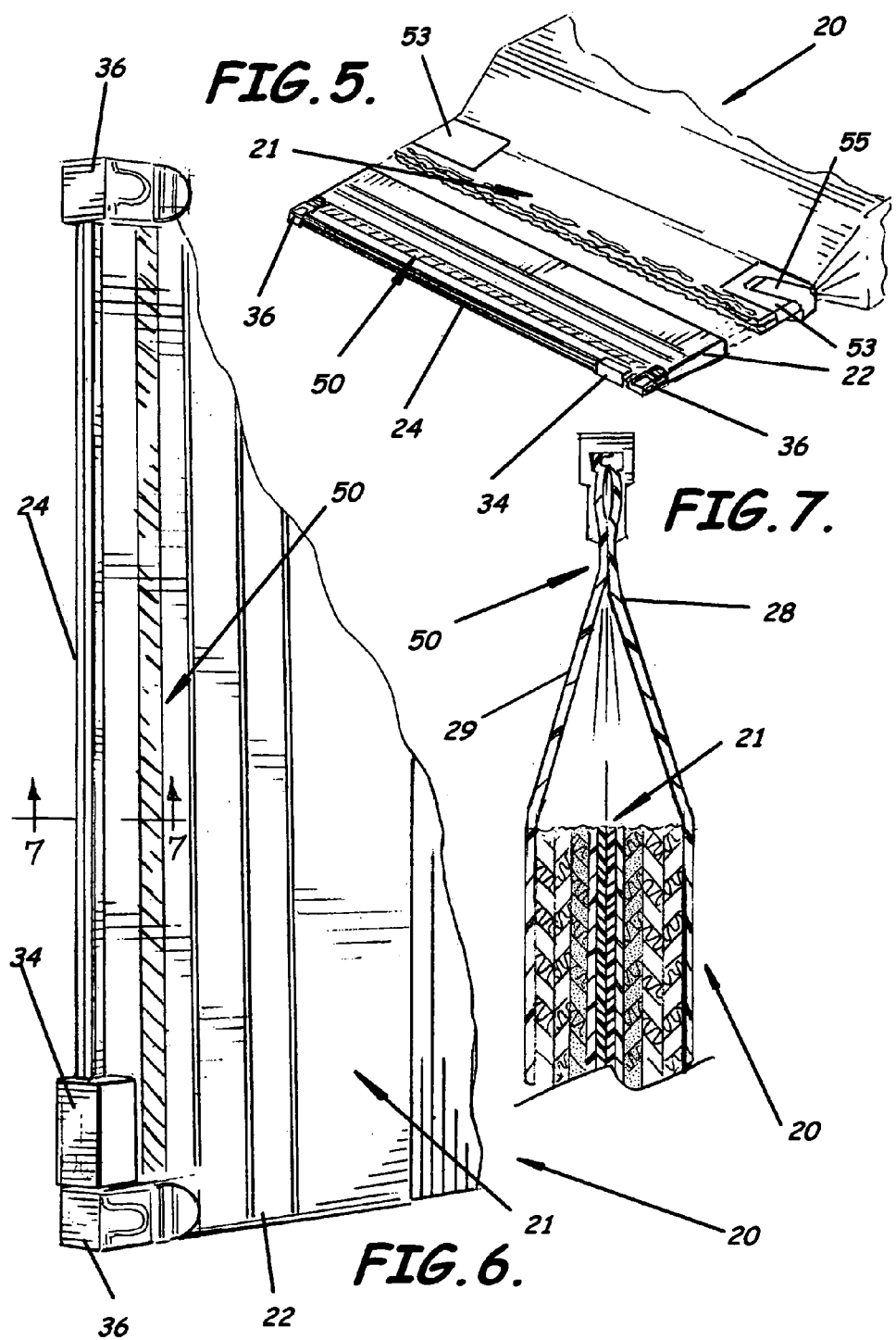

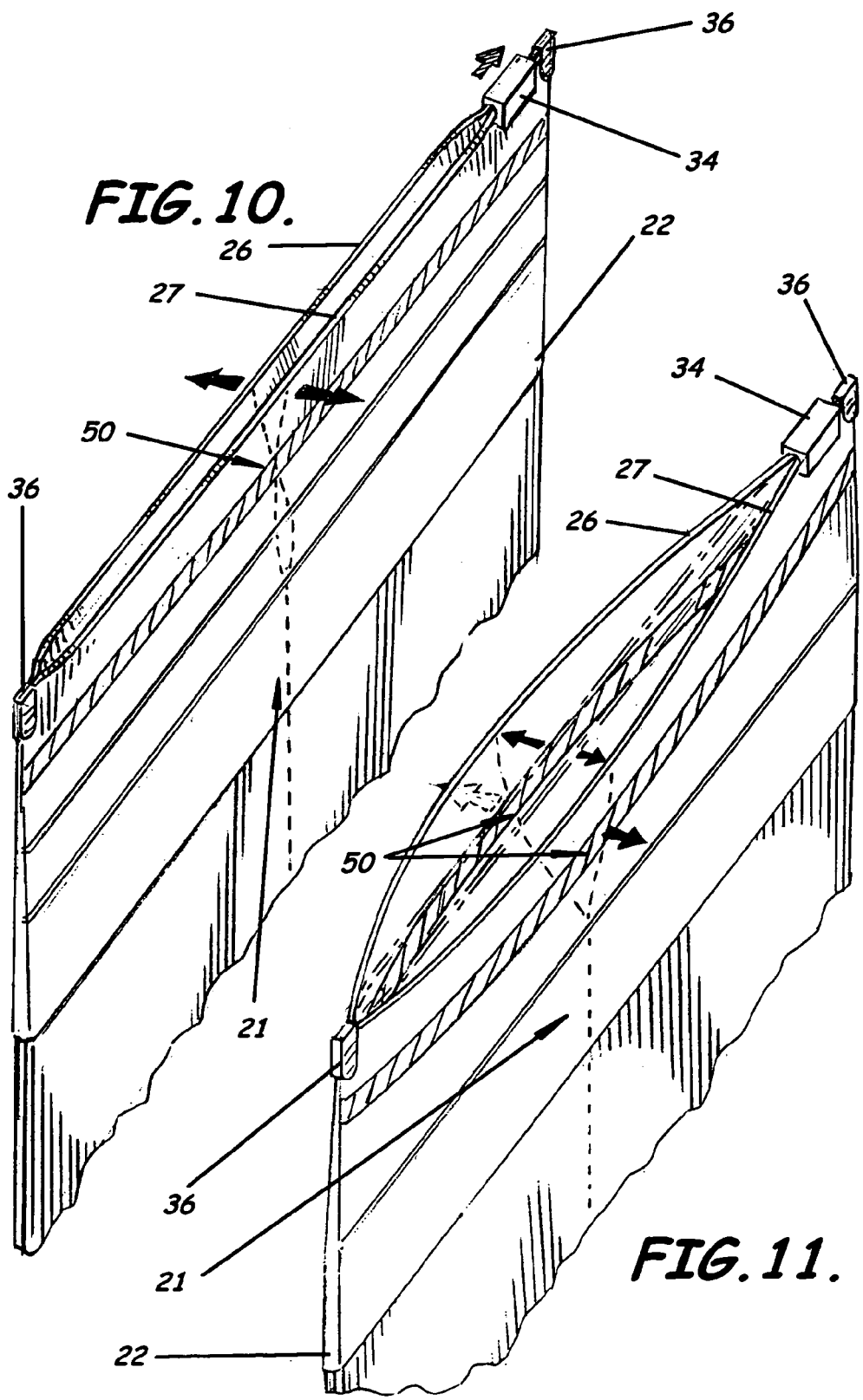

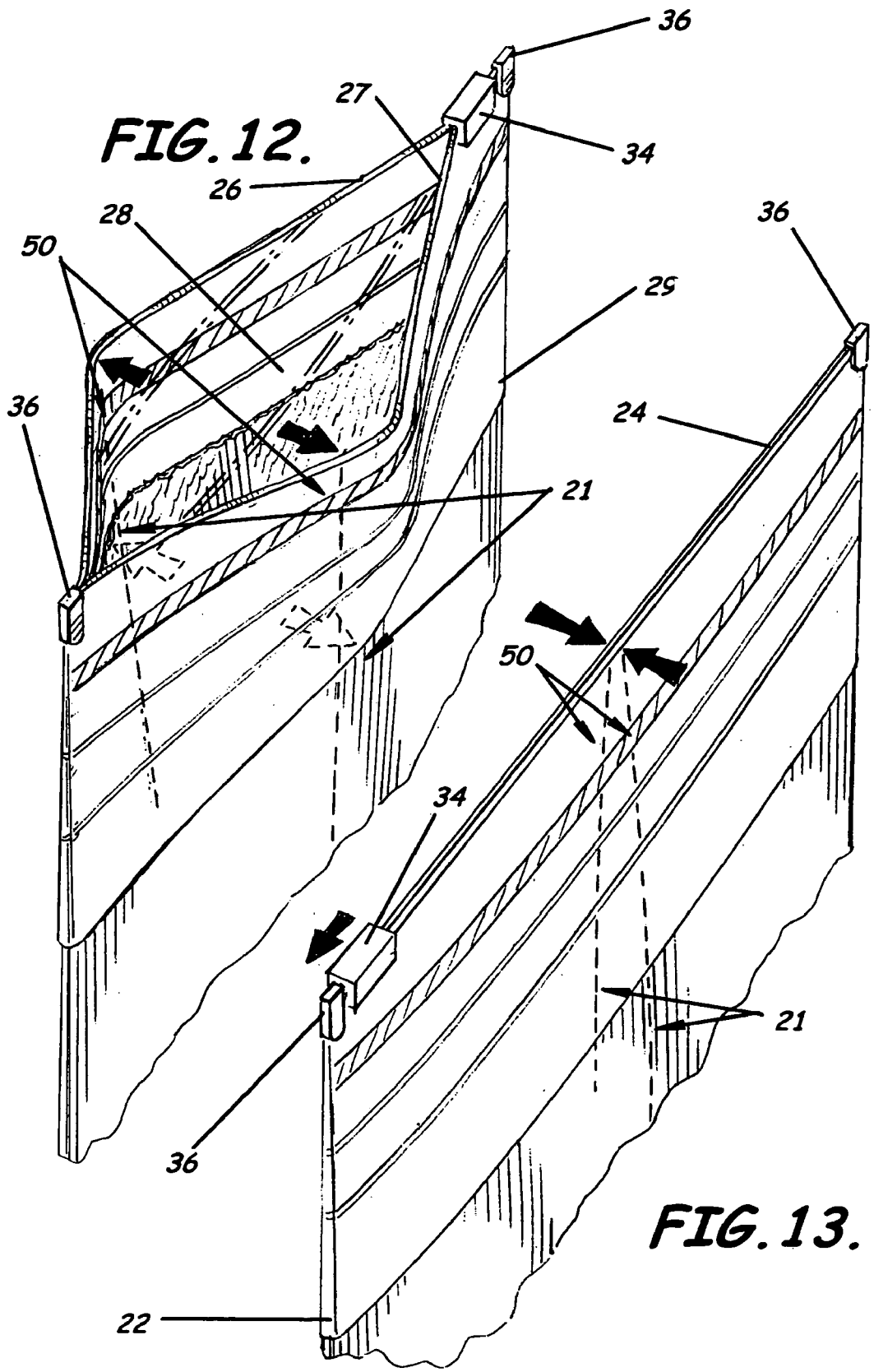

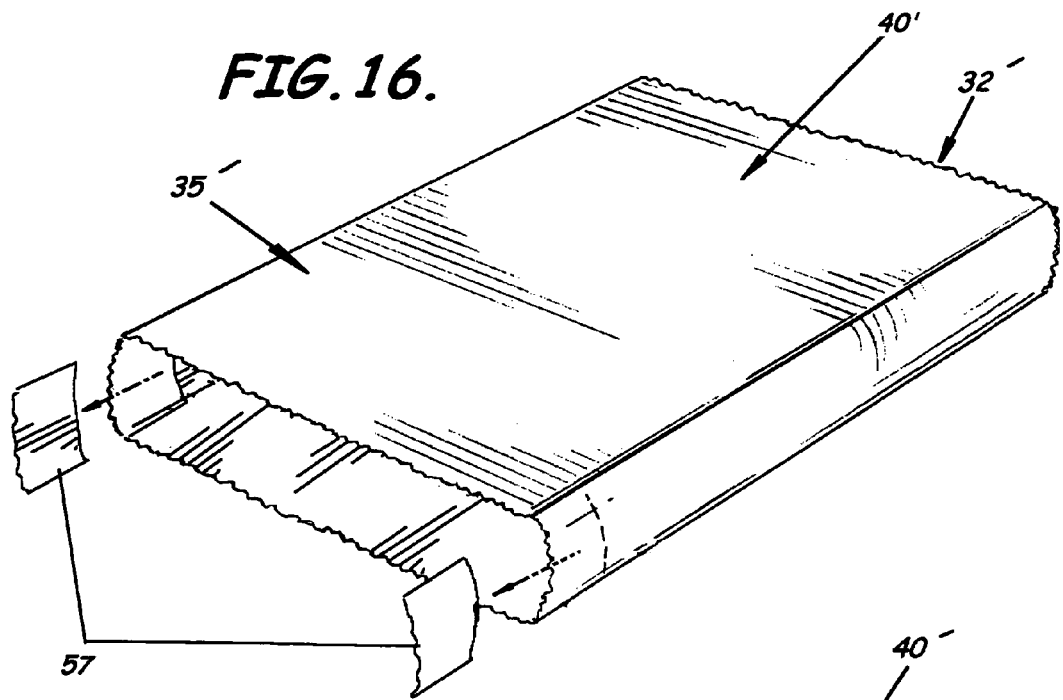
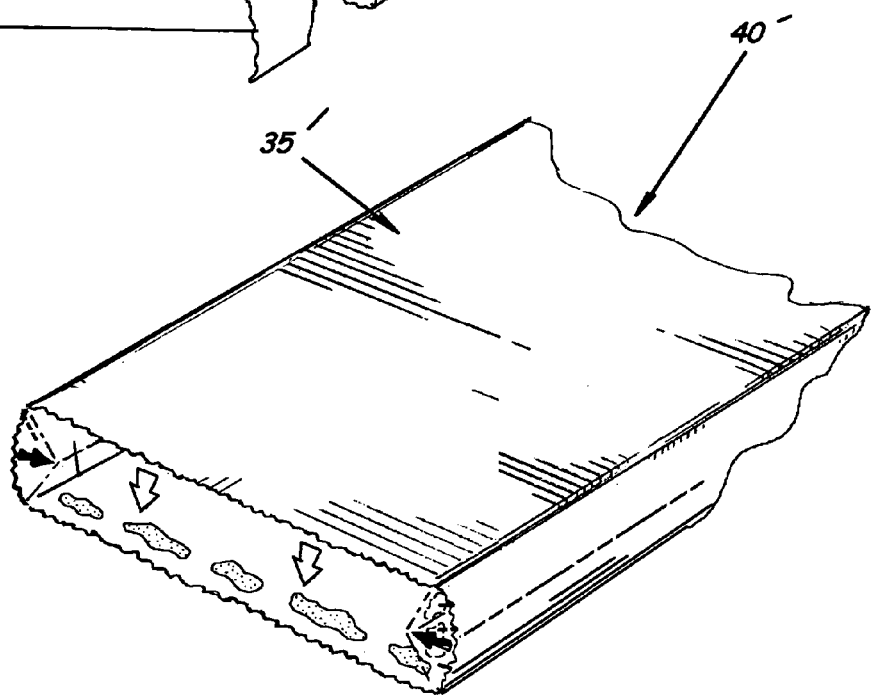

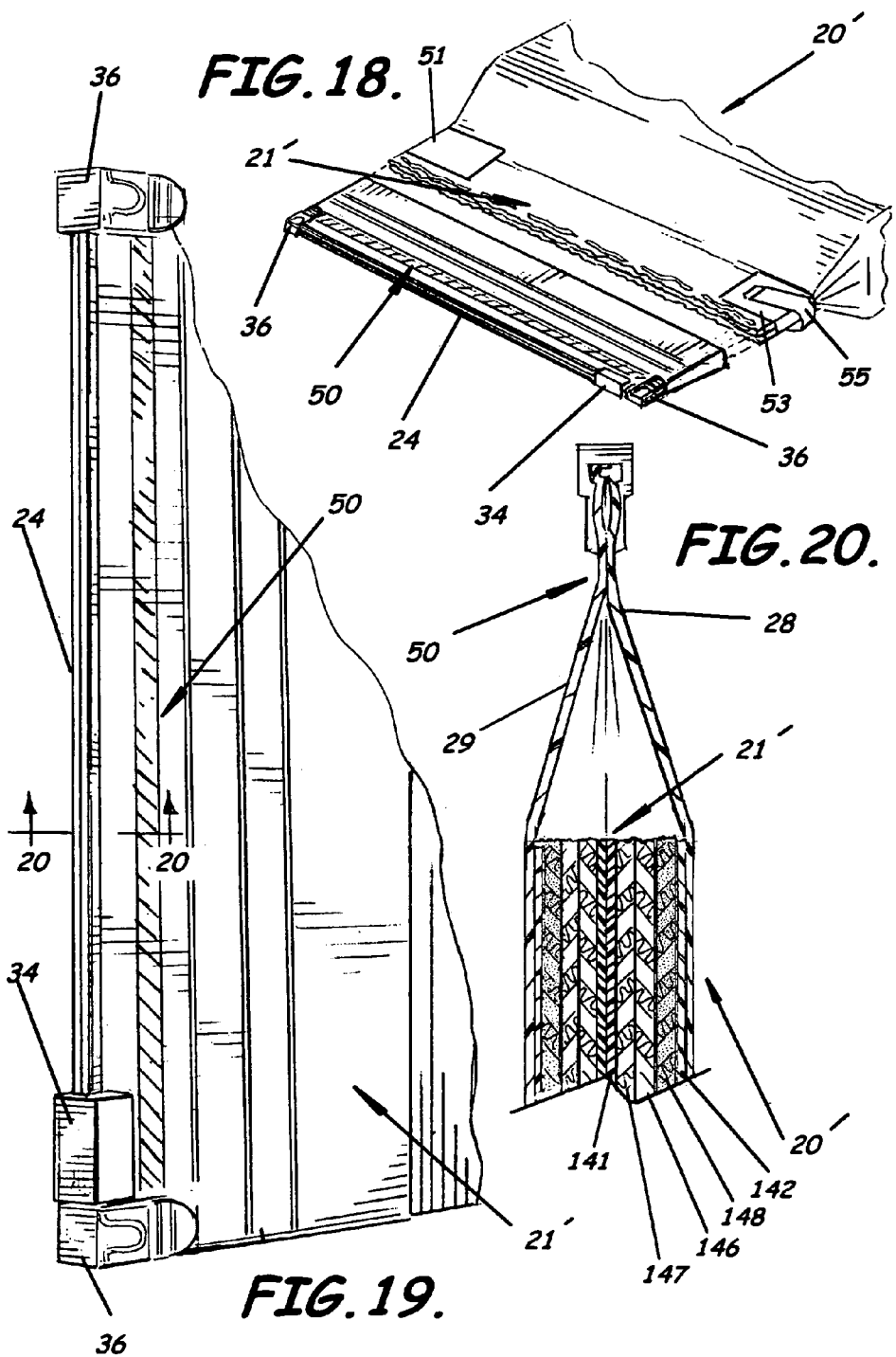

ENHANCED SLIDER ZIPPER MULTIWALL BAG AND ASSOCIATED METHODS

RELATED APPLICATION

This continuation-in-part patent application claims the benefit of co-pending non-provisional patent application with the U.S. Ser. No. 10/290,681, filed on Nov. 8, 2002, still pending which hereby is incorporated by reference in its entirety.

BACKGROUND OF THE INVENTION

1. Field of the Invention

The invention relates generally to the packaging industry. In more specific aspects, the invention relates to multiwall packaging and methods for forming multiwall packaging that have zippers associated with the package.

2. Description of the Related Art

As more and more consumer products are packaged, the need for enhanced consumer end product packaging continues to grow. End product packaging not only has to keep the products fresh, the product packaging needs to protect the environment from the product contents and protect the product contents from the environment. The packaging must also be strong enough to hold materials of varying weights, without being damaged, in order to provide packaging for a vast array of consumer products. Of particular importance is the ease of access to the materials within the packaging. Another important aspect includes tamper resistance to prevent the likelihood of tampering with the contents within the bags.

To increase access to contents within a bag, others have developed many types of bags with many types of closures. Examples of user friendly bags can be found in U.S. Pat. No. 6,376,035 titled "Zipper Fins For Plastic Bags" by Dobreski et al. and U.S. Pat. No. 5,919,535 titled "Fins For Plastic Bags" by Dobreski et al. These plastic bags are provided with a zipper or a slider, a zipper track, and one or more fin members. The consumer can initially open the zippered bag, use a portion of the product, and then easily reclose the bag until the product is needed again. This zipper combination is easily operated and can withstand stronger forces applied thereto than zippers previously used on plastic bags. Applicants have recognized that these zipper combinations described in Dobreski are limited to plastic bags. Although plastic bags can provide adequate packaging for some products, they are simply not durable enough to provide adequate protection for many types of products.

Tampering with consumer goods has also become a problem throughout the years. Packaging producers have been developing better mechanisms to enable consumers to determine if the product within the packaging may have been subjected to some form of tampering or unwanted opening prior to customer purchase. Examples of bags with a tamper evident feature can be found in U.S. Pat. No. 6,286,999 by Catchman titled "Tamper-Evident Reclosable Bag" and U.S. Pat. No. 6,439,770 by Catchman titled "Reclosable Bags Having A Tamper-Evident Retaining Member Extending Through A Slider." These patents describe many types of devices that can be installed along the zipper track of zippered bags to determine if tampering has occurred. Examples include a removable cardboard, paper, or plastic member covering or adjacent to a zipper slider in the closed position and then attached to the bag in some way. If the zipper is moved, the removable member will show signs of tampering. Applicants have recognized that the tamper-evident features in the Catchman patents require the use of some additional element that has to be damaged in order to show signs of tampering.

SUMMARY OF THE INVENTION

In view of the foregoing, an embodiment of the present invention advantageously provides multiwall end product packaging that is fillable from the bottom with a slidable zipper assembly. The end product packaging can include a bag seal zone. In addition to the end product packaging, the present invention also advantageously provides methods of forming such bags. An embodiment of the present invention also advantageously provides a multiwall bag of tubular form having a tamper-evident feature, which is integral with the bag. Further embodiments of the present invention advantageously provide user friendly bags capable of holding products of varying weights, that are strong and durable, that provide consumers with easy access to the products within the bags, and that have a dependable anti-tampering alert mechanism.

More particularly, a multiwall bag according to an embodiment of the present invention includes an inner tube, an outer tube, a bag seal zone, a fin member, a zipper track, and a zipper block. The inner tube preferably has at least one layer of a polymeric material. The inner tube includes an inner front wall region and an inner back wall region positioned to face opposite the inner front wall region. The outer tube preferably has at least one layer of paper material and is positioned to substantially surround outer surfaces of the inner tube. The at least one layer of paper material can include at least one layer of a polymeric material that is positioned so that the polymeric material is in the outermost position of the outer tube. The outer tube has an open end region, a closed end region, an outer front wall region, and an outer back wall region. The closed end region is typically initially in an open position and is adapted to receive filling material therethrough. The closed end region is then sealingly closed to a closed position. The outer front wall region is positioned between the open end region and the closed end region. The outer back wall region is positioned between the open end region and the closed end region and is positioned to face opposite the outer front wall region.

The bag seal zone is formed adjacent the open end of the outer tube so that the at least one layer of polymeric material of inner surfaces of the inner front wall region of the inner tube abuttingly contacts and seals to inner surfaces of the inner back wall region of the inner tube. The bag seal zone can be formed using heat sealing or by using an adhesive material. Other ways to form the bag seal zone will be known to those of ordinary skill in the art and are to be considered within the scope of the present invention.

The fin member is formed of a plastic material and is connected to the bag seal zone, if present. If the bag does not have a bag seal zone, then the fin member is attached adjacent the open end of the outer tube. The fin member extends substantially the entire lateral extent of and along the outer front and back wall regions. The fin member includes at least a pair of spaced-apart elongate fin strips positioned to face opposite each other.

The zipper track is connected to each of the pair of elongate fin strips of the fin member. The zipper track includes a first track strip and a second track strip. The first and second track strips are adapted to be positioned between an open position defined by the first and second track strips being spaced apart to allow access to inner portions of the bag and a sealingly closed position defined by the first and second track strips abuttingly contacting each other to prevent ready access to the inner portions of the bag.

The zipper block is slidably connected to the zipper track to allow the zipper block to slidably move along the zipper track and move the first and second track strips between the open position and the closed position. The fin member, the zipper track, and the zipper block together or in combination define a slider zipper and fin combination. The fin member of the zipper and fin combination can also include a fin seal zone associated with and positioned between the pair of fin strips and positioned adjacent the open end of the outer tube proximal to the zipper track. The fin seal zone can include a score line positioned between the fin strips so that initial opening of the zipper track allows the fin seal zone to be readily separated along the score line.

According to another embodiment of the present invention, the multiwall bag can be altered, for example, by forming a tube body having a plurality of material layers or with the inner tube and outer tube as described above. The tube body has at least one inner layer of polymeric material and at least one outer layer of paper material positioned to substantially surround outer surfaces of the inner layer of polymeric material. The tube body has a pair of opposing tube ends. An outer front wall region is positioned between the pair of opposing tube ends. An outer back wall region is positioned to face opposite the outer front wall region and between the pair of opposing tube ends.

The multiwall bag described herein can also include an outer layer of polymeric material positioned to substantially surround at least one inner layer of polymeric material and a layer of paper material. For example, the multiwall bag can have a three-ply construction with an inner layer of polymeric material, a middle layer of paper material, and an outer layer of polymeric material.

According to another embodiment of the present invention, the multiwall bag can include a plurality of gussets that are formed between the outer front wall region and the outer back wall region of the multiwall bag. At least a first one of the plurality of gussets are formed in a first region between the outer front and back wall regions to define a first outer side wall region. At least a second one of the plurality of gussets is formed in a second region between the outer front and back wall regions to define a second outer side wall region. The second outer side wall region is advantageously positioned opposite the first outer side wall region. The multiwall bag further includes an adhesive material positioned adjacent the plurality of gussets to thereby define a plurality of sealed gussets. The sealed gussets advantageously increase drop and abuse resistance of the bag, reduce the risk of access to contents of a bag by a pest, and reduce sifting of filling material when positioned in the bag. To further secure the plurality of sealed gussets, the multiwall bag can also include an external reinforcement that is positioned to overlie each of the plurality of sealed gussets. The external reinforcement preferably extends past each of the sealed gussets to cover regions of the front and back wall regions adjacent to each of the sealed gussets. The external reinforcement enhances the strength and stiffness of each of the sealed gussets and further reduces the risk of access to contents of the bag by a pest.

The external reinforcement can include various types of reinforcements. For example, tape, ribbons, labels, clips, brads, or bands could be used. Other suitable types of external reinforcement means will be known to those of skill in the art and are to be considered within the scope of the present invention.

In addition to the multiwall bottom fillable bags, the present invention also advantageously provides methods of forming a multiwall bag having a zipper associated therewith. A method of forming the multiwall bag includes laminating a plurality of layers of material. Complete, continuous, or a combination of complete and continuous lamination is preferred in the bag seal zone, as understood by those of skill in the art. The plurality of layers preferably includes at least one layer of polymeric material and at least one layer of paper material. Once the layers of material are laminated, the layers are formed into a tube body. At least one layer of the polymeric material defines an inner surface of the tube body and the at least one layer of paper material defines an outer surface of the tube body. The tube body has a front wall and a back wall positioned to face opposite the front wall. An end portion of the inner surface of the front wall is sealed to an opposite facing end portion of the inner surface of the back wall to thereby define a bag seal zone. A combination of a fin member, a zipper track connected to the fin member, and a zipper block connected to the zipper track are connected to or attached to the bag seal zone of bag.

The method of forming the multiwall bag, for example, can be altered by supplying layers of materials that are already laminated according to the present invention. If the materials are already laminated, then the tube body can be formed without having to laminate the materials.

It is envisioned that the bottom fillable multiwall packaging end products of the present invention can be used for any type of product that requires easy access to the contents within and the strength of a multiwall bag. Such product uses include bags for various food items, pet food, charcoal, building materials, seed, lawn and garden supplies, and other uses as will be known to one skilled in the art and are to be considered within the scope of this invention.

BRIEF DESCRIPTION OF THE DRAWINGS

So that the manner in which the features and advantages of the invention, as well as others which will become apparent, may be understood in more detail, more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 1 is a perspective view of a multiwall bag with a bag seal zone and a slider zipper and fin combination according to an embodiment of the present invention;

FIG. 2 is an enlarged fragmentary sectional view of a multiwall bag taken along line 2—2 of FIG. 1 according to an embodiment of the present invention;

FIG. 5 is a fragmentary perspective view of a tube body with a bag seal zone being connected to a slider zipper and fin combination according to an embodiment of the present invention;

FIG. 6 is an enlarged perspective fragmentary view of a slider zipper and fin combination connected to the bag seal zone of a multiwall bag according to an embodiment of the present invention;

FIG. 7 is a fragmentary sectional view of a slider zipper and fin combination connected to the bag seal zone of a multiwall bag taken along line 7—7 of FIG. 6 according to an embodiment of the present invention;

FIG. 10 is a fragmentary perspective view of a multiwall bag having a zipper block opened and prior to breaking a seal within the bag seal zone according to an embodiment of the present invention;

FIG. 11 is a fragmentary perspective view of a multiwall bag being opened along a score line and the seal being opened within the bag seal zone according to an embodiment of the present invention;

FIG. 12 is a fragmentary perspective view of a multiwall bag having a zipper block and a bag seal zone in an open position according to an embodiment of the present invention;

FIG. 13 is a fragmentary perspective view of a multiwall bag having a zipper block in a closed position and a bag seal zone remaining in an open position according to an embodiment of the present invention;

FIG. 16 is a perspective view of a tube body having a plurality of gussets with an inner ply removed formed therein according to an embodiment of the present invention;

FIG. 17 is a perspective view of a tube body having a plurality of gussets and having a bag seal zone formed therein using an adhesive material according to an embodiment of the present invention;

FIG. 18 is a perspective view of a tube body having a slider zipper and fin combination applied thereto according to an embodiment of the present invention;

FIG. 19 is an enlarged perspective fragmentary view of a slider zipper and fin combination adhesively connected to a multiwall bag according to an embodiment of the present invention;

FIG. 20 is a fragmentary sectional view of a slider zipper and fin combination adhesively connected to the bag seal zone of a multiwall bag taken along line 20—20 of FIG. 19 according to an embodiment of the present invention;

DETAILED DESCRIPTION

The present invention will now be described more fully hereinafter with reference to the accompanying drawings, which illustrate preferred embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. The prime notation, if used, indicates similar elements in alternative embodiments.

Figure 3:
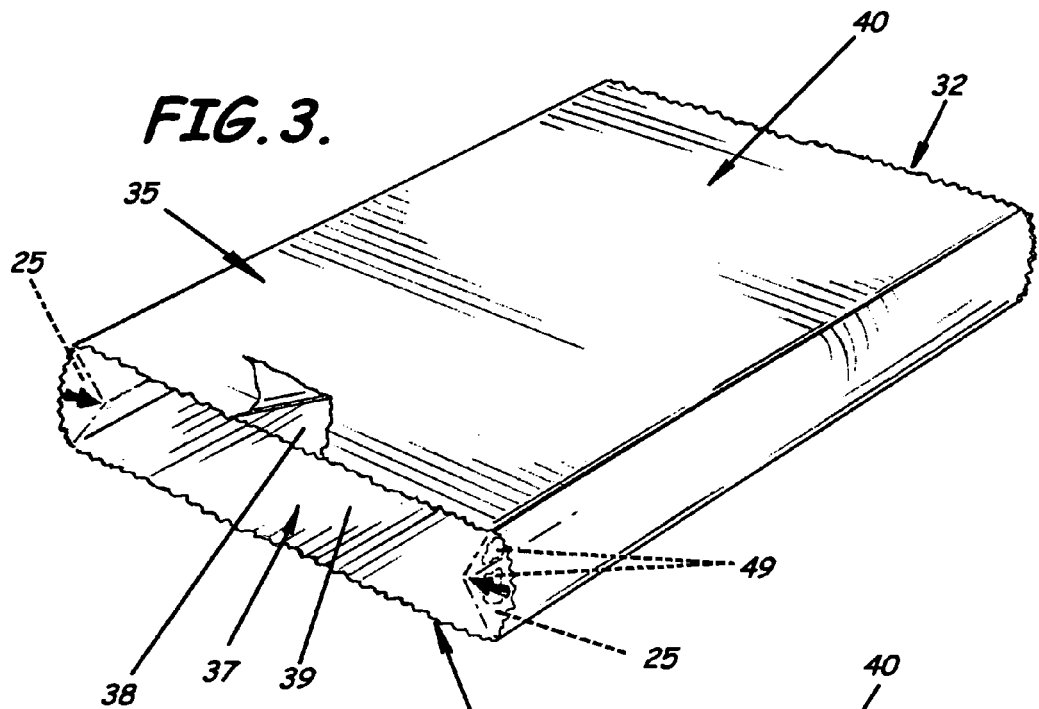
FIG. 3 is a perspective view of a tube body having a plurality of gussets formed therein according to an embodiment of the present invention.

As illustrated in FIGS. 1–21, an embodiment of the present invention advantageously provides a multiwall bag 20 of tubular form. The multiwall bag 20 includes an inner tube 37, an outer tube 35, a bag seal zone 21, a fin member 22, a zipper track 24, a zipper block 34, a plurality of gussets 25, and an external reinforcement 53 for the plurality of gussets 25, as shown in FIGS. 1, 5, 8, 9, 14, and 18. The inner tube 37 preferably has at least one layer of a polymeric material 41. The inner tube 37 includes an inner front wall region 38 and an inner back wall region 39 positioned to face opposite the inner front wall region 38 (see FIG. 3). The outer tube 35 preferably has at least one layer of paper material 46. The outer tube 35 is positioned to substantially surround outer surfaces of the inner tube 37. The outer tube 35 has an open end region 31, a closed end region 32, an outer front wall region 33, and an outer back wall region 34. The closed end region 32 is typically initially in an open position and is adapted to receive filling material F therethrough. The closed end region 32 is then sealingly closed to a closed position (see FIG. 9). The outer front wall region 33 is positioned between the open end region 31 and the closed end region 32 such as illustrated (see FIGS. 1–3). The outer back wall region 34 also is positioned between the open end region 31 and the closed end region 32 and is positioned to face opposite the outer front wall region 33.

External reinforcement 53 can include various types of reinforcements. For example, tape, ribbons, labels, clips, brads, or bands could be used. Other suitable types of external reinforcement means will be known to those of skill in the art and are to be considered within the scope of the present invention.

The bag seal zone 21 is formed adjacent the open end 31 of the outer tube 35 (see FIGS. 1 and 3–4) so that the at least one layer of polymeric material 41 of inner surfaces of the inner front wall region 38 of the inner tube 37 abuttingly contacts and seals to inner surfaces of the inner back wall region 39 of the inner tube 37.

The plurality of gussets 25 is preferably formed between the outer front wall region and the outer back wall region of the multiwall bag 20. At least a first one of the plurality of gussets 25 is formed in a first region between the outer front and back wall regions so as to define a first outer side wall region. At least a second one of the plurality of gussets 25 is formed in a second region between the outer front and back wall regions so as to define a second outer side wall region. The second side wall region is positioned opposite the first outer side wall region. The multiwall bag 20 further includes an adhesive material positioned adjacent the plurality of gussets 25 to thereby define a plurality of sealed gussets 25. The plurality of sealed gussets 25 increase drop and abuse resistance of the bag 20, reduce the risk of access to contents of a bag 20 by a pest, and reduce sifting of filling material when positioned in the bag 20.

An external reinforcement 53 is advantageously positioned to overlie each of the plurality of sealed gussets 25. The external reinforcement 53 extends past each of the sealed gussets 25 to cover regions of the front and back wall regions adjacent to each of the sealed gussets 25. The external reinforcement 53 thereby enhances the strength and stiffness of each of the sealed gussets 25 and further reduces the risk of access to contents of the bag 20 by a pest.

The multiwall bag 20 can include a handle 55 that is attached to the external reinforcement 53, as shown in FIGS. 1, 5, 8, 9, 14, and 18. The handle 55 enables consumers to better handle the multiwall bag 20. The handle 55 can be used to pour the contents contained within the multiwall bag 20 out of the bag 20 or to transport the multiwall bag 20 to another location.

Figure 4:
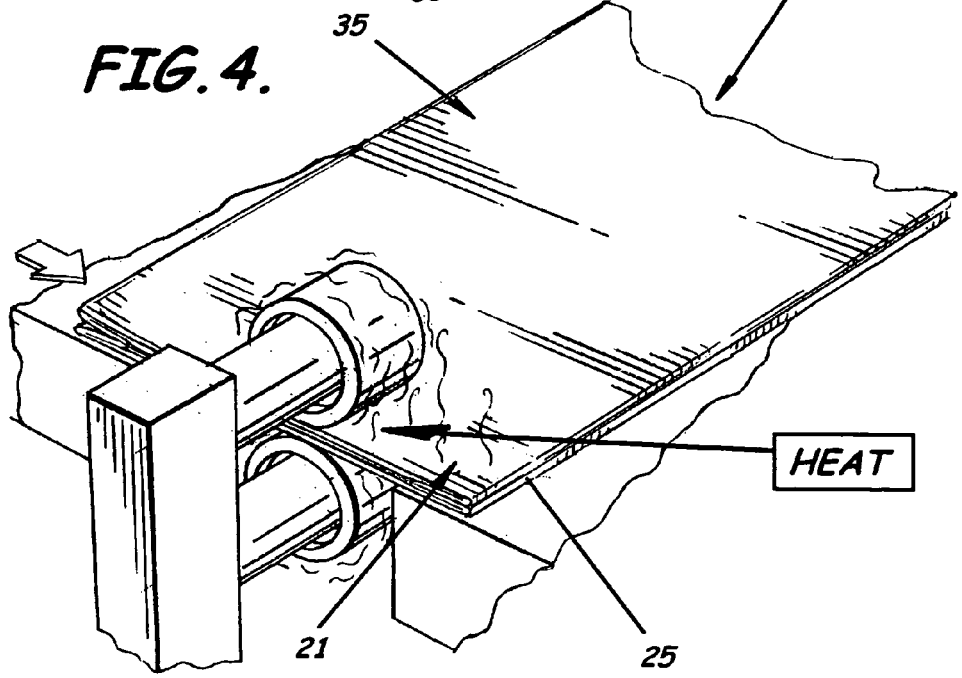
FIG. 4 is a fragmentary perspective view of heat being applied to a tube body to form a bag seal zone of a multiwall bag according to an embodiment of the present invention.
Figure 8:
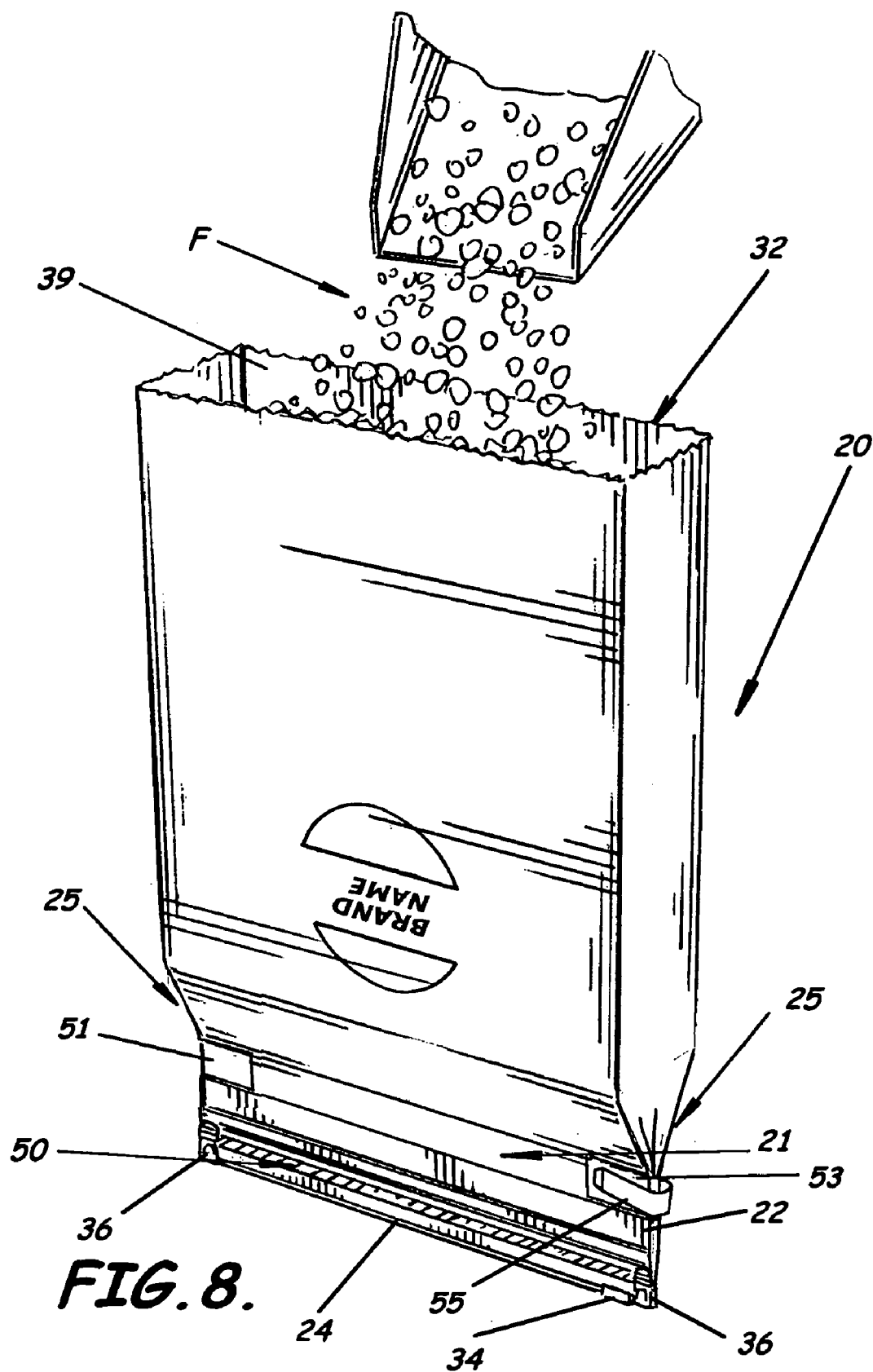
FIG. 8 is perspective view of a multiwall bag being bottom filled with a filling material according to an embodiment of the present invention.
Figure 9:
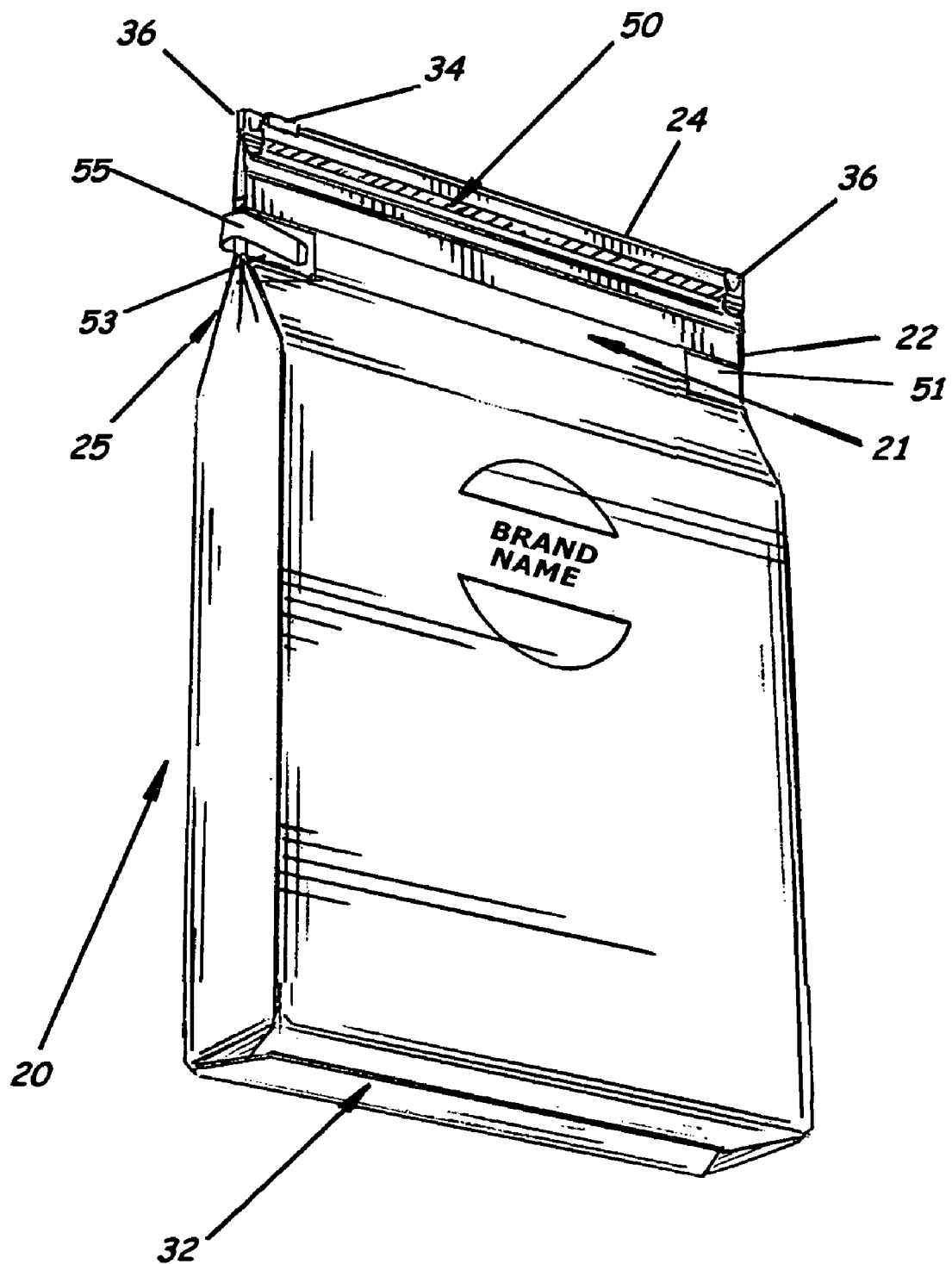
FIG. 9 is a perspective view of a multiwall bag having slider zipper and fin combination filled with a product and having a closed end region in closed position according to an embodiment of the present invention.
Figure 14:
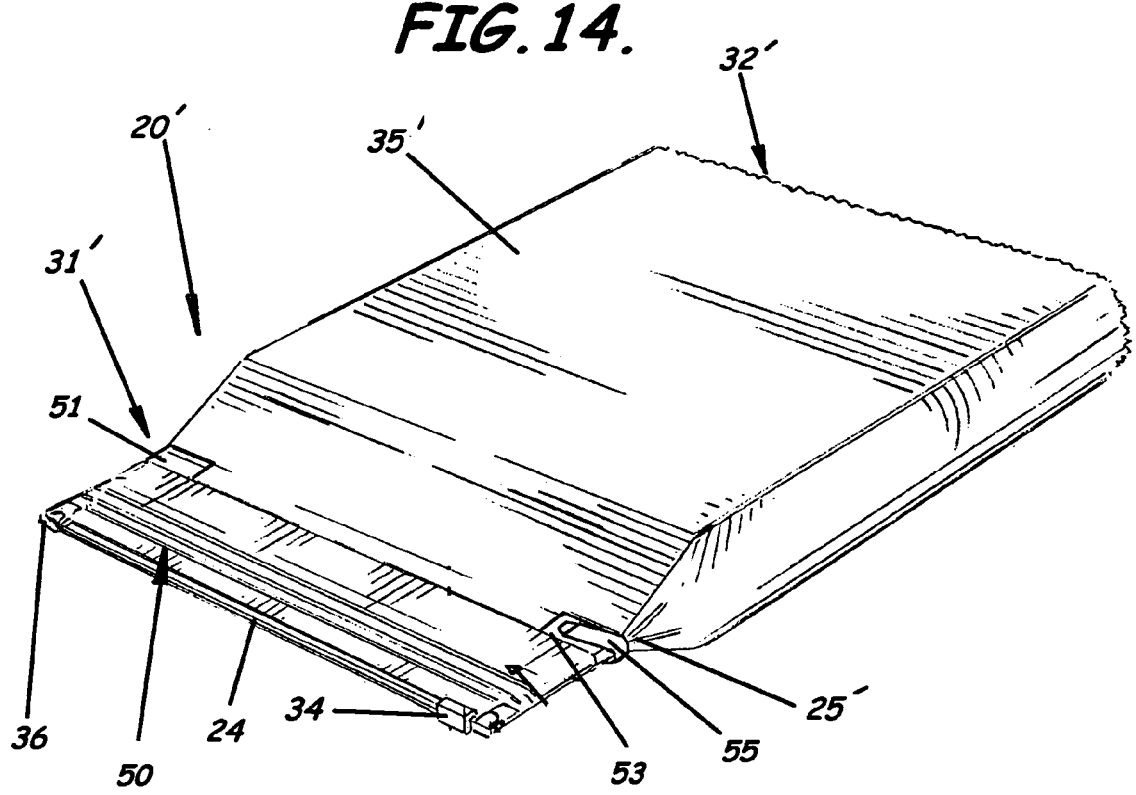
FIG. 14 is a perspective view of a multiwall bag with a bag seal zone using an adhesive material as the inner layers of the bag seal zone and a slider zipper and fin combination according to an embodiment of the present invention.
Figure 15:
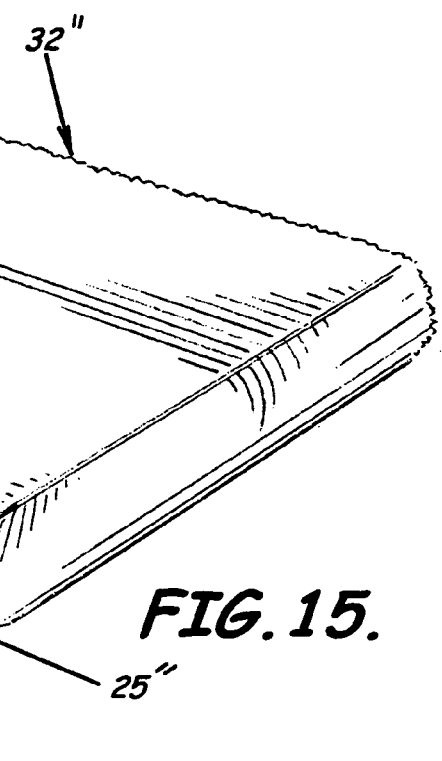
FIG. 15 is a perspective view of a multiwall bag with a bag seal zone using an adhesive material as the inner layers of the bag seal zone and a slider zipper and fin combination according to an embodiment of the present invention.

The fin member 22 is preferably formed of a plastic material that can be connected to or attached to the bag 20 using a heat seal, such as shown in FIG. 4. Use of heat to adhere the fin member 22 to the bag 20 can be used when the outermost ply of the bag 20 is a polymeric material. The heat enables the polymers contained with the plastic material of the fin member 22 and the polymeric material to form an adhesive bond between the two materials that enables the fin member 22 to become adhered to the bag 20.

As shown in FIGS. 5 and 6, the fin member 22 is formed of a plastic material and is connected to or attached to the bag seal zone 21. This connection or attachment, for example, can be on the outer surface of the outer tube 35 such as by use of an adhesive material as illustrated or by attachment to one of the inner layer 41 of the inner tube 37 or to any layers 42, 47, 48 therebetween (see FIGS. 2, 5 and 7). The fin member 22 extends substantially the entire lateral extent of and along the outer front and back wall regions 33, 34. The fin member 22 can include at least a pair of spaced-apart elongate fin strips 28, 29 positioned to face opposite each other.

The zipper track 24 is connected to each of the pair of elongate fin strips 28, 29 of the fin member 22. The zipper track 24 includes a first track strip 26 and a second track strip 27. The first and second track strips 26, 27 are adapted to be positioned between an open position defined by the first and second track strips 26, 27 being spaced apart to allow access to inner portions of the bag 20 and a sealingly closed position defined by the first and second track strips 26, 27 abuttingly contacting each other to prevent ready access to the inner portions of the bag 20 (see FIGS. 10–13). The zipper block 34 is slidably connected to the zipper track 24 to allow the zipper block 34 to slidably move along the zipper track 24 and move the first and second track strips 26, 27 between the open position and the closed position. The fin member 22, the zipper track 24, and the zipper block 34 together and in combination define a slider zipper and fin combination.

According to another embodiment, construction for the multiwall bag 20 can be altered, for example, by forming a tube body 40 from a plurality of layers of material or by having the inner tube 37 and outer tube 35 as described above as understood by those skilled in the art. The tube body 40 has at least one inner layer 41 of polymeric material and at least one outer layer 46 of paper material positioned to substantially surround outer surfaces of the inner layer 41 of polymeric material. The tube body 40 has a pair of opposing tube ends 31, 32. An outer front wall region 33 is positioned between the pair of opposing tube ends. An outer back wall region 34 is positioned to face opposite the outer front wall region 33 and between the pair of opposing tube ends 31, 32.

The at least one layer 46 of paper material of the outer tube 35 can include a polymeric material layer that is positioned so that when the multiwall bag 20 is constructed, the polymeric material layer is the most external, or outermost, layer.

As shown in FIG. 6, the multiwall bag 20 can include a pair of corner clips 36 each connected to an opposite end of the zipper track 24 and to the fin member 22. The corner clips 36, for example, advantageously help reduce the risk of damage to the zipper block 34 and can operate as a stop to the zipper block 34 at opposing ends of the zipper track 24.

The bag seal zone 21 preferably includes a heat seal at least positioned between the slider zipper and fin combination and outer surfaces of the outer tube 35 so that inner surfaces of the polymeric material of the inner front wall region 38 are heatingly sealed to the inner surfaces of the polymeric material of the inner back wall region 39 (see FIGS. 4 and 9–13). When the bag 20 is filled from the closed end (see FIGS. 8–9), the heat seal enhances protection of the slider and zipper combination by operating as a stop region or constructive bottom for the filling material and thereby enhances filling performance of the bag 20. As will be understood by those skilled in the art, the heat seal preferably allows the inner surfaces of the inner front wall and inner back wall regions 38, 39 to pealingly separate and unseal the inner surfaces of the inner front and back wall regions 38, 39 without significant or substantial damage to the inner surfaces when initially opening the bag 20 through the slider zipper and fin combination (see FIGS. 10–13).

The bag seal zone 21 can be formed using an adhesive material to create an adhesive seal that is at least positioned between the slider zipper and fin combination and outer surfaces of the outer tube 35, as shown in FIGS. 18–20. When the bag seal zone 21 is formed using an adhesive material, inner surfaces of the polymeric material of the inner front wall region 38 are adhesively sealed to the inner surfaces of the polymeric material of the inner back wall region 39, as shown in FIGS. 17 and 20. When the multiwall bag 20 is filled from the closed end region 32, the adhesive seal enhances protection of the slider and zipper combination by operating as a stop region for the filling material, which enhances filling performance of the bag 20. The adhesive seal advantageously allows the inner surfaces of the inner front wall and inner back wall regions 38, 39 to pealingly separate and unseal the inner surfaces of the inner front and back wall regions without substantial damage to the inner surfaces thereof when initially opening the bag 20 through the slider zipper and fin combination.

The multiwall bag 20 of an embodiment of the present invention also advantageously provides anti-tampering properties to indicate whether the bag 20 has already been opened. In the embodiments containing the bag seal zone 21, once the bag seal zone 21 has been opened initially as shown in FIGS. 10–13, the bag seal zone 21 further remains unsealed even when the zipper block 34 is in the closed position as shown in FIG. 13. The inability to reseal the bag seal zone 21 as initially sealed indicates that initial opening has occurred and that tampering with the opening of the bag 20 may have occurred.

Various materials or chemical compounds can be used as the polymeric material of the inner layer 41 (or plurality of layers 41, 42) the inner tube 37. Preferably the polymeric material is selected from at least one of the following: polyethylene, polypropylene, nylon, ethylene vinyl acetate, ethylene vinyl alcohol, maleic anhydride grafted polyethylenes and propylenes, polyesters, and PTE. The polymeric material preferably enhances the effectiveness of the heat seal and yet reducing risk of damage to the polymeric material. Other suitable polymeric materials will be known to those skilled in the art and are to be considered within the scope of the present invention. As understood by those skilled in the art, the polymeric material is preferably formed by at least one of the following: extrusion, co-extrusion, lamination, and coating processes.

Oil and grease resistance is an important property for bags 20, particularly when containing various types of food products, including pet food. Oil and grease resistance protects the contents within the bag 20 from the outside, while also protecting the outside from the contents. In all embodiments of the present invention, the multiwall bag 20 can be constructed to provide oil and grease resistance to the bag 20. The multiwall bag 20 can be constructed so the inner tube 37 further has a second layer 42 formed of a grease resistant material (see FIG. 2). The second layer 42 preferably overlies the first layer 41 as illustrated. The at least one paper layer 46 of the outer tube 35 also can be a plurality of paper layers 46, 47, 48. The outer tube 35 further includes at least one grease resistant barrier 48 associated with the plurality of paper layers 46, 47, 48. The second layer 42 of the inner tube 37 can be constructed from at least one of the following materials: nylon, rubber, vinyl, and polymeric materials. The grease resistant barrier 48 of the outer tube 35 can be constructed by using a grease resistant coating, applying a chemical to at least one of the plurality of paper layers 46, 47, 48 or providing a separate non-paper material layer 48.

The outer tube 35 can have a plurality of gussets 25 formed between the outer front wall region 33 and the outer back wall region 34. At least a first one of the plurality of gussets 25 is preferably formed in a first region between the outer front and back wall regions 38, 39 so as to define a first outer side wall region. At least a second one of the plurality of gussets 25 is preferably formed in a second region between the outer front and back wall regions 38, 39 so as to define a second outer side wall region positioned opposite the first outer side wall region (see, e.g., FIGS. 3–4). The bag 20 further can have an adhesive material 49 positioned adjacent the plurality of gussets 25 so that when the heat seal is formed, the adhesive material 49 also is reheated to thereby enhance sealing adjacent the gussets 25, such as when passing through the nip of a heat sealer as shown in FIG. 4, and thereby define a plurality of sealed gussets 25 to increase drop and abuse resistance of the bag 20 by strengthening the regions around the gusset and allowing the bag 20 to flex when contents are positioned therein. This enhanced sealing of the gussets 25 can also advantageously reduce the risk of access to contents of a bag 20 by a pest and can also reduce sifting of filling material when positioned in the bag 20.

The fin member 22 of the zipper and fin combination can include a fin seal zone associated with and positioned between the pair of fin strips 28, 29 and positioned adjacent the open end 31 of the outer tube 35 proximal to the zipper track 24. In all embodiments of the present invention, the fin seal zone preferably includes a score line 50 that is positioned between the fin strips 28, 29, as illustrated in FIGS. 10 and 11. The score line 50 ensures that an initial opening of the zipper track 24 allows the fin seal zone to be readily separated in the proper location to provide access to the filling material and inner contents of the bag 20. The score line 50 provides another anti-tampering indication that the zipper track 24 has at least been initially opened.

As another embodiment of the present invention, a multiwall bag 20 of tubular form is advantageously provided. In this embodiment, the bag 20 preferably includes an inner tube 37 that has least one layer of polymeric material that includes an inner front wall region 38 and an inner back wall region 39 positioned to face opposite the inner front wall region 38. The bag 20 also includes an outer tube 35 that contains at least one layer of paper material. The outer tube 35 is advantageously positioned to substantially surround outer surfaces of the inner tube 37. The outer tube 35 has an open end region and a closed end region that is initially in an open position. The closed end region is advantageously adapted to receive filling material therethrough, and then be sealingly closed to a closed position once filled. The bag 20 also includes an outer front wall region that is positioned between the open end region and the closed end region. The bag 20 includes an outer back wall region that is also positioned between the open end region and the closed end region and is positioned to face opposite the outer front wall region.

The bag 20 includes a fin member 22 that is formed of a plastic material and connected to the outer front and back walls. The fin member 22 extends substantially the entire lateral extent of and along the outer front and back wall regions of the bag 20. The fin member 22 advantageously includes at least a pair of spaced-apart elongate fin strips positioned to face opposite each other. A zipper track 24 is also provided as a component of the bag 20. The zipper track 24 is connected to each of the pair of elongate fin strips of the fin member 22. The zipper track 24 preferably includes a first track strip and a second track strip. The first and second track strips can be adapted to be positioned between an open position and a sealingly closed position. The open position is defined by the first and second track strips being spaced apart to allow access to inner portions of the bag 20. The sealingly closed position is defined by the first and second track strips abuttingly contacting each other to prevent ready access to the inner portions of the bag 20.

The multiwall bag 20 also advantageously includes a zipper block 34 that is slidably connected to the zipper track 24. The manner in which the zipper block 34 and the zipper track 24 are connected allows the zipper block 34 to slidably move along the zipper track 24 and move the first and second track strips between the open position and the closed position. The fin member 22, the zipper track 24, and the zipper block 34 advantageously define a slider zipper and fin combination.

A multiwall bag 20 having reinforced gussets 25 is advantageously provided as another embodiment of the present invention. The multiwall bag 20 preferably includes an inner tube 37, an outer tube 35, a fin member 22, a zipper track 24, a zipper block 34, a plurality of gussets 25, and an external gusset reinforcement 53.

The inner tube 37 preferably has at least one layer of polymeric material that includes an inner front wall region 38 and an inner back wall region 39. The inner back wall region 39 positioned to face opposite the inner front wall region 38.

The outer tube 35 preferably has at least one layer of paper material and is positioned to substantially surround outer surfaces of the inner tube 37. The outer tube 35 has an open end region, a closed end region, an outer front wall region, and an outer back wall region. The closed end region is initially in an open position and is adapted to receive filling material therethrough, and then sealingly close to a closed position. The outer front wall region is advantageously positioned between the open end region and the closed end region. The outer back wall region is positioned between the open end region and the closed end region and positioned to face opposite the outer front wall region.

The fin member 22 is preferably formed of a plastic material and is connected to the outer front and back walls and extending substantially the entire lateral extent of and along the outer front and back wall regions of the multiwall bag 20. The fin member 22 includes at least a pair of spaced-apart elongate fin strips positioned to face opposite each other.

The zipper track 24 is connected to each of the pair of elongate fin strips of the fin member 22. The zipper track 24 preferably includes a first track strip and a second track strip, which are adaptable to be positioned between an open position defined by the first and second track strips being spaced apart to allow access to inner portions of the bag 20 and a sealingly closed position defined by the first and second track strips abuttingly contacting each other to prevent ready access to the inner portions of the bag 20.

The zipper block 34 is slidably connected to the zipper track 24 to allow the zipper block 34 to slidably move along the zipper track 24 and move the first and second track strips between the open position and the closed position. The fin member 22, the zipper track 24, and the zipper block 34 define a slider zipper and fin combination.

The plurality of gussets 25 is advantageously formed between the outer front wall region and the outer back wall region. At least a first one of the plurality of gussets 25 is formed in a first region between the outer front and back wall regions so as to define a first outer side wall region. At least a second one of the plurality of gussets 25 is formed in a second region between the outer front and back wall regions so as to define a second outer side wall region positioned opposite the first outer side wall region. The multiwall bag 20 further includes an adhesive material positioned adjacent the plurality of gussets 25 to thereby define a plurality of sealed gussets 25. The sealed gussets 25 increase drop and abuse resistance of the bag 20, reduce the risk of access to contents of a bag 20 by a pest, and reduce sifting of filling material when positioned in the bag 20.

The external reinforcement 53 is advantageously positioned to overlie each of the plurality of sealed gussets 25. The external reinforcement 53 extends past each of the sealed gussets 25 to cover regions of the front and back wall regions adjacent to each of the sealed gussets 25 to thereby enhance the strength and stiffness of each of the sealed gussets 25 and further reduce the risk of access to contents of the bag 20 by a pest.

Another embodiment of a multiwall bag 20 having reinforced gussets 25 is also advantageously provided. In this embodiment, the multiwall bag 20 includes an inner tube 37, an outer tube 35, a plurality of gussets 25 that become sealed through the application of an adhesive material, and an external reinforcement 53. As in all embodiments containing the plurality of sealed gussets 25, the sealed gussets 25 increase the drop and abuse resistance of the bag 20, reduce the risk of access to contents of a bag 20 by a pest, and reduce shifting of filling material when the material is positioned in the multiwall bag 20.

In all embodiments of the present invention, the plurality of gussets 25 can be formed so that there is at least one less one ply of material 57 in at least the first and second outer side walls than in the outer and inner front wall regions, 33, 34, as shown in FIG. 16. It is advantageous to remove at least one ply of material 57 when forming the sealed gussets 25, as described herein, so that the adhesive 49 used to form the gussets 25 can be melted sufficiently. Additional plies or layers can be removed, if necessary to sufficiently melt the adhesive 49. Inner or middle plies are preferably removed, when plies are required to be removed. When the bag 20 is formed with the plurality of gussets 25, the gussets 25 increase the number of plies that the heat has to pass through. For example, with a three ply bag, when gussets 25 are formed, the three plies become twelve plies within the cross-section of the gusset. Removable of one ply would reduce the number of total plies in the cross-section of the gusset to eight plies, instead of twelve.

Figure 21:
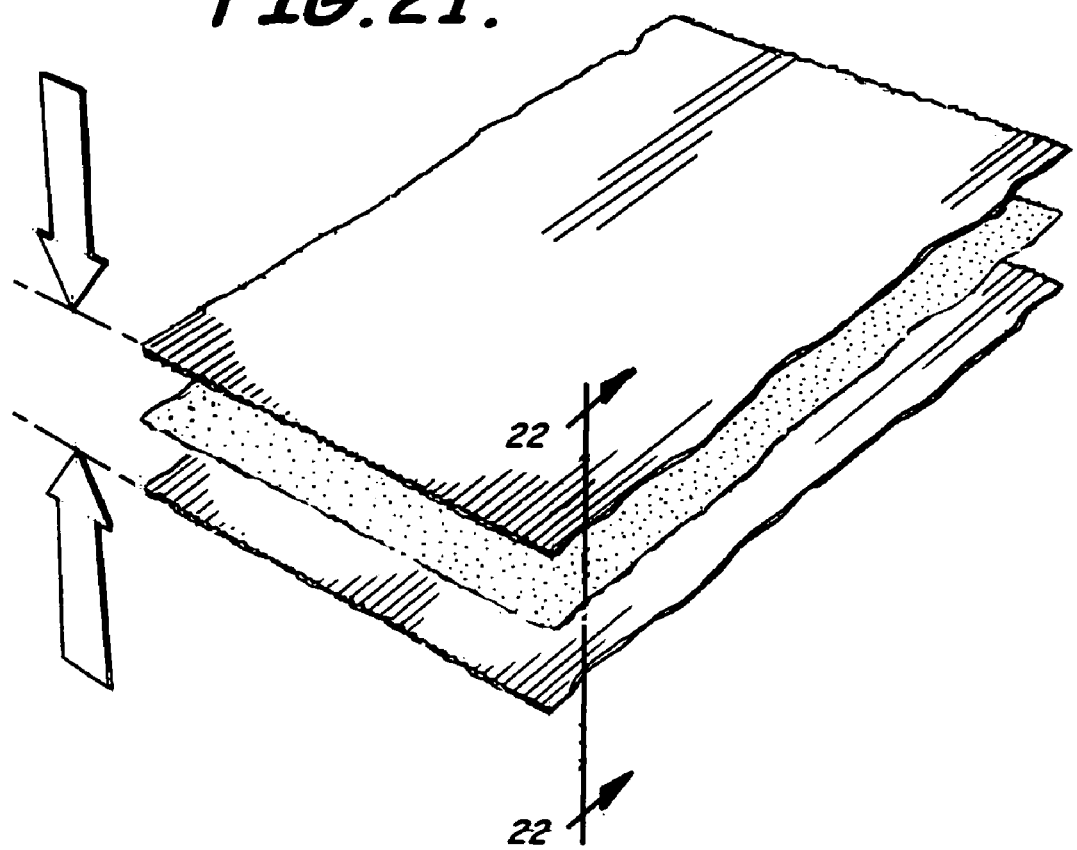
FIG. 21 is a perspective view of two substrates with an adhesive layer being positioned between the two substrates so that complete lamination occurs in the bag seal zone when forming a tube body in accordance with an embodiment of the present invention.
Figure 22:
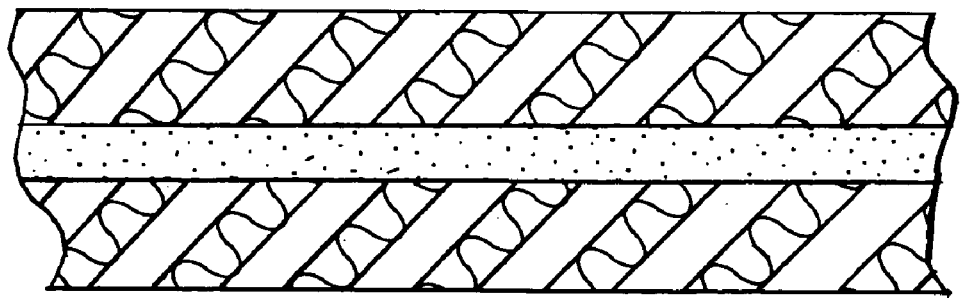
FIG. 22 is a sectional view of two substrates having an adhesive layer positioned between the two substrates taken along line 21—21 of FIG. 20 according to an embodiment of the present invention.
Figure 23:
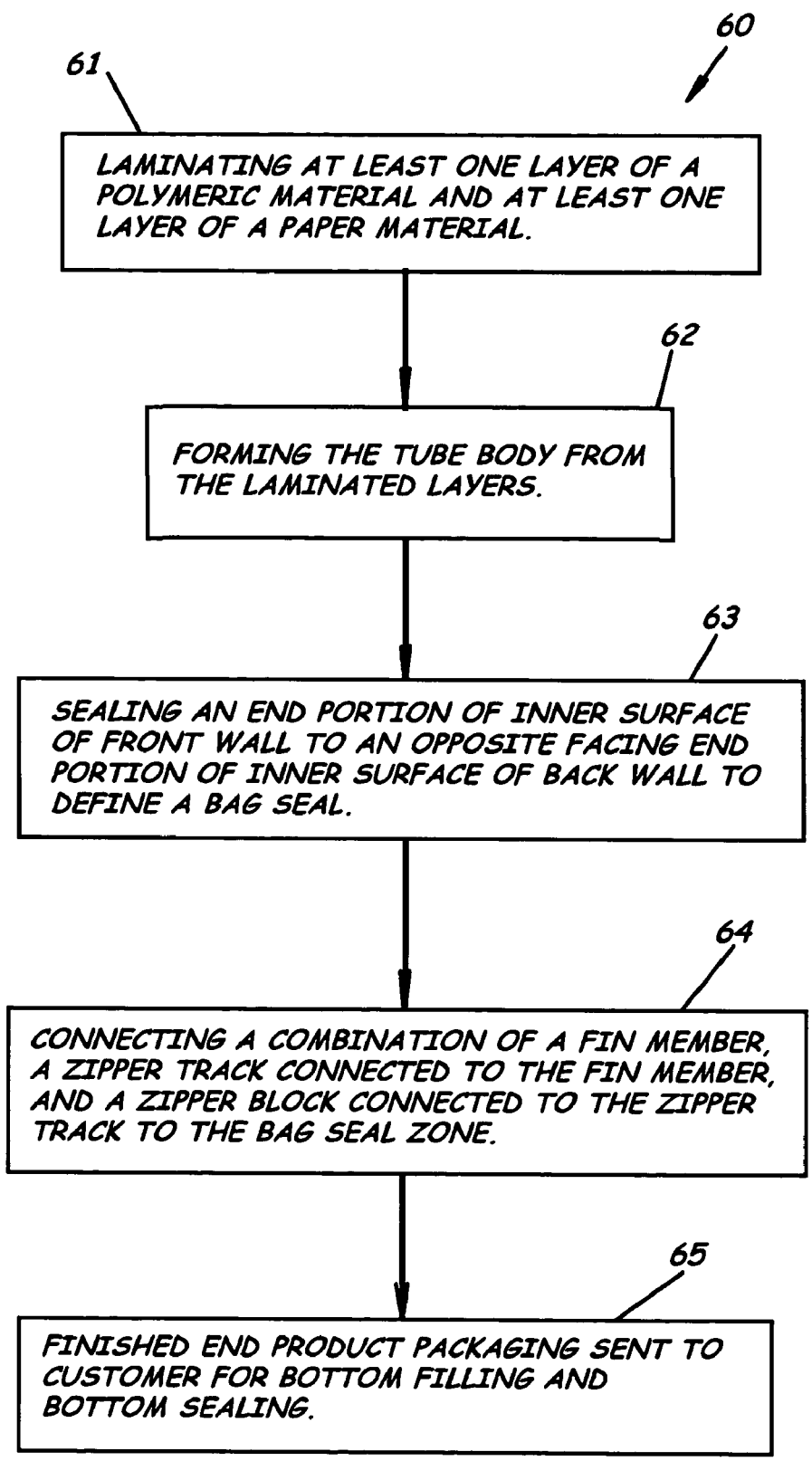
FIG. 23 is a flow diagram of a method of producing a multiwall bag according to an embodiment of the present invention.

As shown in FIGS. 1–21, in addition to the multiwall bottom fillable bags 20, the present invention also advantageously provides a method of forming a multiwall bag 20 having a zipper associated therewith. The method 60 of forming the multiwall bag 20 includes laminating a plurality of layers 41, 42, 46, 47, 48 of material (block 61) (see FIGS. 3–4 and 14). Complete lamination can be used in the bag seal zone, as shown in FIG. 21, and as understood by those of ordinary skill in the art. Continuous lamination or the combination of complete and continuous lamination can also be used in the bag seal zone. The plurality of layers 41, 42, 46, 47, 48 preferably includes at least one layer 41 of polymeric material and at least one layer 46 of paper material. Once the layers 41, 42, 46, 47, 48 of material are laminated, the layers 41, 42, 46, 47, 48 are formed into a tube body 40 (block 62). The at least one layer 41 of the polymeric material defines an inner surface of the tube body 40 and the at least one layer 46 of paper material defines an outer surface of the tube body 40. The tube body 40 has a front wall and a back wall positioned to face opposite the front wall. An end portion of the inner surface of the front wall is sealed to an opposite facing end portion of the inner surface of the back wall to thereby define a bag seal zone 21 (block 63). A combination of a fin member 22, a zipper track 24 connected to the fin member 22, and a zipper block 34 connected to the zipper track 24 is connected to the bag seal zone 21 (block 64). The finished or end product packaging can then be sent to a customer for bottom filling and bottom sealing (block 65) or such filling and sealing of the bag 20 can be performed on site if desired.

The method of forming the multiwall bag 20, for example, can be altered by supplying layers of materials that are already laminated. If the materials are already laminated, then the tube body 40 can be formed without having to laminate the materials.

In addition to the steps described, the method of forming can include applying an adhesive material 49 in regions of the tube body 40 between peripheral side edges of the front and back walls to form a plurality of gussets 25 in the tube body 40 extending between the front wall and the back wall to thereby define a pair of gusseted side walls. Heat can then be applied to at least one of the respective end portions 31, 32 of the front and back walls of the tube body 40 and positioning the inner surfaces of the respective end portions of the front and back walls to abuttingly contact each other so that the inner surfaces of the front and back walls adhere to each other and form a seal therebetween. The adhesive material 49 on outer surfaces of end portions of the pair of gusseted side walls is reactivated when heat is applied to at least one of the respective end portions of the front and back walls and holding the gusseted side walls to also form a seal in the gusseted side walls so that the sealed gusseted side walls can further define a portion of the bag seal zone 21 if desired. For example, as will be understood by those skilled in the art, the adhesive material can be applied to an outer surface of the tube body 40 and allowed to dry. The adhesive material can be reactivated during application of a heat seal such as in a bottomer or bottom forming machine as understood by those skilled in the art. End portions of the gussets 25 can then be sealed by use of the reactivated adhesive as the gussets 25 pass through a nip or nip region of a machine, which applies contact pressure on the end portions of the gussets 25.

The sealed end portion of the tube body 40 preferably includes a first end portion and a second end portion. The tube body 40 is preferably filled with a filling material F through the second end portion when the first end portion is sealed so that the bag seal zone 21 operates as a stop to flow of filling material into the tube body 40 or as a constructive bottom (see FIG. 8). This, for example, can advantageously prevent contact of the filling material F within the tube body 40 with the zipper track 24 and zipper block 34. The second end portion is then closed after the tube body 40 is filled with a desired quantity of filling material F (see FIG. 9).

Embodiments of the present invention also provide an additional methods of using or additional steps to the forming methods described herein. The zipper block 34, for example, can be positioned in an open position. The zipper track 24 is then separated to provide access to inner portions of the tube body 40. Also, separation of a fin seal zone can be performed by separating the fin strips 28, 29 along a score line 50 such as formed with a laser or other device as understood by those skilled in the art. The inner surface of the front wall is then pealingly separated from the inner surface of the back wall in the bag seal zone 21 without causing any damage to the inner surfaces in the bag seal zone 21 (see FIGS. 10–13). This also provides direct access to the contents of the tube body 40.

For example, a method of using a bag 20 can advantageously include filling a bag 20 with product through a first end of the bag 20 and stopping the product from reaching a second end of the bag 20 by a bag seal zone 21 positioned adjacent the second end. The second end has at least a combination of a zipper track 24 and a zipper block 34 positioned on the zipper track 24, and more preferably a fin member 22 connected to the zipper track 24 as well, connected to the second end so that the bag seal zone 21 operates as a constructive bottom to thereby enhance protection of the combination of the zipper track 24 and the zipper block 34 during filling.

A method of using a bag 20 can also include moving a zipper block 34 positioned on a zipper track 24 to a zipper block 34 open position. The zipper track 24 is connected to a fin member 22, and the fin member 22 is connected to a sealed end of a bag 20 defining a bag seal zone 21. The fin member 22 has a fin seal zone positioned between the zipper track 24 and the bag seal zone 21. The method can further include separating the zipper track 24 to a zipper track 24 open position, separating the fin seal zone along a score line formed therein to provide access to the bag seal zone 21, and separating the bag seal zone 21 to thereby provide access to contents of the bag 20.

The combination of the fin member 22, the zipper track 24, and the zipper block 34 can be connected to the bag seal zone 21 by several methods. If the outer surfaces of the tube body 40 contain a polymeric material, then the combination of the fin member 22, the zipper track 24, and the zipper block 34 can be connected by forming a heat seal between the fin member 22 and the outer surfaces of the tube body 40. Other methods of connecting the combination of the fin member 22, the zipper track 24, and the zipper block 34 can include at least one of the following: applying an adhesive material between inner surfaces of the fin member 22 and outer surfaces of the tube body 40 in the bag seal zone 21, adhering the fin member 22 to the tube body 40 between the at least one polymeric layer 41 and the at least one paper layer 46, and adhering the fin member 22 to inner surfaces of the tube body 40. Other methods for connected the combination to the bag seal zone 21 will be known of ordinary skill in the art and are to be considered within the scope of the present invention.

Several advantages exist with the present invention. As a first advantage of the present invention, the bag seal zone 21 of the multiwall bag 20 provides users with an indicator to determine if the bag 20 has already been open. This indication alerts consumers of possible tampering of with the bag 20. The bag seal zone 21 also protects the zipper combination that is used to seal the multiwall bag 20.

As another advantage of the present invention, the multiwall bag 20 is constructed in such a manner to prevent insects from being able to access the contents within the bag 20. The bag seal zone 21 and the adhesively secured gussets 25 provide additional protection so that insects will not be able to gain access to the interior of the bag 20.

From the foregoing it will be seen that the invention is well adapted to attain all of the ends and objects hereinabove set forth, together with other advantages that are obvious and that are inherent to the method and product. It will be understood that certain features and sub-combinations are of utility and may be employed without reference to other features and sub-combinations. This is contemplated by and is within the scope of the claims.

Because many possible embodiments may be made of the invention without departing from the scope thereof, it is to be understood that all matter herein set forth or shown in the accompanying specification is to be interpreted as illustrative and not in a limiting sense. It should be apparent to those skilled in the art that the invention is susceptible to various changes without departing from the scope of the invention.

For example, various types of substrates with or without coatings can be used to form the tube body of the multiplayer bag. Suitable substrates and coatings will be known to one skilled in the art. The use of the bottom fillable multiplayer bag with zipper combination can be used for many types of consumer end products, such as candy wrappers, food items, or any type of packaging that needs a strong bag with easy access to the contents of the bags.

That claimed is:

1. A multiwall bag of tubular form comprising:
   an inner tube having at least one layer of polymeric material including an inner front wall region and an inner back wall region positioned to face opposite the inner front wall region;
   an outer tube having at least one layer of paper material and positioned to substantially surround outer surfaces of the inner tube, the outer tube having an open end region, a closed end region being initially in an open position, adapted to receive filling material therethrough, and then sealingly closed to a closed position, an outer front wall region positioned between the open end region and the closed end region, and an outer back wall region positioned between the open end region and the closed end region and positioned to face opposite the outer front wall region;
   a bag seal zone formed adjacent the open end of the outer tube so that the at least one layer of polymeric material of inner surfaces of the inner front wall region of the inner tube abuttingly contacts and seals to inner surfaces of the inner back wall region of the inner tube;

a fin member formed of a plastic material and connected to the bag seal zone and extending substantially the entire lateral extent of and along the outer front and back wall regions, the fin member including at least a pair of spaced-apart elongate fin strips positioned to face opposite each other;

a zipper track connected to each of the pair of elongate fin strips of the fin member, the zipper track including a first track strip and a second track strip, the first and second track strips being adapted to positioned between an open position defined by the first and second track strips being spaced apart to allow access to inner portions of the bag and a sealingly closed position defined by the first and second track strips abuttingly contacting each other to prevent ready access to the inner portions of the bag;

a zipper block slidably connected to the zipper track to allow the zipper block to slidably move along the zipper track and move the first and second track strips between the open position and the closed position, the fin member, the zipper track, and the zipper block defining a slider zipper and fin combination;

a plurality of gussets formed between the outer front wall region and the outer back wall region, at least a first one of the plurality of gussets being formed in a first region between the outer front and back wall regions so as to define a first outer side wall region and at least a second one of the plurality of gussets being formed in a second region between the outer front and back wall regions so as to define a second outer side wall region positioned opposite the first outer side wall region, and wherein the bag further comprises an adhesive material positioned adjacent the plurality of gussets to thereby define a plurality of sealed gussets to increase drop and abuse resistance of the bag, to reduce the risk of access to contents of a bag by a pest, and to reduce sifting of filling material when positioned in the bag; and an external reinforcement positioned adjacent the open end of the outer tube and adapted to overlie and cover regions of the front and back wall regions adjacent to each of the sealed gussets to thereby enhance the strength and stiffness of each of the sealed gussets and further reduce the risk of access to contents of the bag by a pest.

2. A multiwall bag as defined in claim 1, wherein each of the plurality of gussets has at least one less one ply of material in at least the first and second outer side walls than in the outer and inner front wall regions.

3. A multiwall bag as defined in claim 1, further comprising a pair of corner clips each connected to an opposite end of the zipper track and to the fin member to reduce the risk of damage to the zipper block, and wherein the combination of the inner tube and outer tube define a tube body of the bag.

4. A multiwall bag as defined in claim 1, wherein the bag further includes a handle attached to the external reinforcement to provide easier handling of the bag.

5. A multiwall bag as defined in claim 1, wherein the fin member of the zipper and fin combination includes a fin seal zone associated with and positioned between the pair of fin strips and positioned adjacent the open end of the outer tube proximal to the zipper track, the fin seal zone including a score line positioned between the fin strips so that initial opening of the zipper track allows the fin seal zone to be readily separated along the score line.

6. A multiwall bag as defined in claim 1, wherein the at least one layer of paper material of the outer tube includes a polymeric material layer positioned so that when the multiwall bag is constructed, the polymeric material layer is an outermost layer of the outer tube of the multiwall bag.

7. A multiwall bag as defined in claim 1, wherein the bag seal zone is formed using a lamination process selected from the group consisting of completion lamination, continuous lamination, and combinations thereof.

8. A multiwall bag as defined in claim 1, wherein the bag seal zone comprises a heat seal at least positioned between the slider zipper and fin combination and outer surfaces of the outer tube so that inner surfaces of the polymeric material of the inner front wall region are heatingly sealed to the inner surfaces of the polymeric material of the inner back wall region so that when the bag is filled from the closed end, the heat seal enhances protection of the slider and zipper combination by operating as a stop region for the filling material and thereby enhances filling performance of the bag.

9. A multiwall bag as defined in claim 8, wherein the heat seal allows the inner surfaces of the inner front wall and inner back wall regions to pealingly separate and unseal the inner surfaces of the inner front and back wall regions without substantial damage to the inner surfaces thereof when initially opening the bag through the slider zipper and fin combination.

10. A multiwall bag as defined in claim 8, wherein the bag seal zone further remains unsealed after initial opening even when the zipper block is in the closed position to thereby indicate that initial opening has occurred and indicate that tampering with the opening of the bag may have occurred.

11. A multiwall bag as defined in claim 8, wherein the polymeric material comprises at least one of the following: polyethylene, polypropylene, nylon, ethylene vinyl acetate, ethylene vinyl alcohol, maleic anhydride grafted polyethylenes and propylenes, polyesters, and PTE to thereby enhance effectiveness of the heat seal and yet reducing risk of damage to the polymeric material.

12. A multiwall bag as defined in claim 1, wherein the bag seal zone comprises an adhesive seal at least positioned between the slider zipper and fin combination and outer surfaces of the outer tube so that inner surfaces of the polymeric material of the inner front wall region are adhesively sealed to the inner surfaces of the polymeric material of the inner back wall region so that when the bag is filled from the closed end, the adhesive seal enhances protection of the slider and zipper combination by operating as a stop region for the filling material and thereby enhances filling performance of the bag.

13. A multiwall bag as defined in claim 12, wherein the adhesive seal allows the inner surfaces of the inner front wall and inner back wall regions to peelingly separate and unseal the inner surfaces of the inner front and back wall regions without substantial damage to the inner surfaces thereof when initially opening the bag through the slider zipper and fin combination.

14. A multiwall bag as defined in claim 1, wherein the at least one layer of the inner tube comprises a first layer, and wherein the inner tube further has a second layer formed of a grease resistant material and overlying the first layer, wherein the at least one paper layer of the outer tube comprises a plurality of paper layers, and wherein the outer tube further comprises at least one grease resistant barrier associated with the plurality of paper layers.

15. A multiwall bag as defined in claim 14, wherein the second layer of the inner tube comprises at least one of the following materials: nylon, rubber, vinyl, and polymeric material, and wherein the at least one grease resistant barrier of the outer tube comprises at least one of the following: a grease resistant coating, a chemical applied to at least one of the plurality of paper layers, and a separate non-paper material layer.

16. A multiwall bag of tubular form comprising:
a tube body having at least one inner layer of polymeric material and at least one outer layer of paper material positioned to substantially surround outer surfaces of the inner layer of polymeric material, the tube body having a pair of opposing tube ends, an outer front wall region positioned between the pair of opposing tube ends, an outer back wall region positioned to face opposite the outer front wall region and between the pair of opposing tube ends;
a bag seal zone formed adjacent one of the pair of tube ends so that an inner surface of the at least one layer of polymeric material of the front wall of the inner tube abuttingly contacts and seals to an inner surface of the back wall of the tube body;
a fin member adhesively connected to the bag seal zone and extending substantially the entire lateral extent thereof, the fin member including at least a pair of spaced-apart elongate fin strips positioned to face opposite each other and each positioned to extend along one of the either the outer front or back wall regions;
a zipper track connected to each of the pair of elongate fin strips of the fin member, the zipper track including a first track strip and a second track strip, the first and second track strips being adapted to be positioned between an open position defined by the first and second track strips being spaced apart to allow access to inner portions of the bag and a sealingly closed position defined by the first and second track strips abuttingly contacting each other to prevent ready access to the inner portions of the bag; and
a zipper block connected to the zipper track to allow the zipper block to slidably move along the zipper track and move the first and second track strips between the open position and the closed position.

17. A multiwall bag as defined in claim 16, further comprising a pair of corner clips each connected to an opposite end of the zipper track and to the fin member.

18. A multiwall bag as defined in claim 16, wherein the at least one outer layer of paper of the outer tube further includes a polymeric material layer positioned so that when the multiwall bag is assembled, the polymeric material layer is an outermost layer of the outer tube of the multiwall bag.

19. A multiwall bag as defined in claim 16, wherein the fin member includes a fin seal zone associated with and positioned between the pair of fin strips and positioned proximal to the zipper track, the fin seal zone including a score line positioned between the fin strips so that initial opening of the zipper track allows the fin seal zone to be readily separated along the score line.

20. A multiwall bag as defined in claim 16, wherein the bag seal zone is formed using a lamination process selected from the group consisting of completion lamination, continuous lamination, and combinations thereof.

21. A multiwall bag as defined in claim 16, wherein the bag seal zone comprises a heat seal positioned between the zipper block and outer surfaces of the tube body so that an inner surface of the polymeric material of the inner front wall region are heatingly sealed to the inner surface of the polymeric material of the inner back wall region so that when the bag is filled from the closed end, the heat seal enhances protection of the slider and zipper combination by operating as a stop region for the filling material.

22. A multiwall bag as defined in claim 21, wherein the heat seal allows the inner surfaces of the inner front wall and inner back wall regions to peelingly separate and unseal the inner surfaces of the inner front and back wall regions without substantial damage to the inner surfaces thereof when initially opening the bag through the zipper track.

23. A multiwall bag as defined in claim 21, wherein the bag seal zone further remains unsealed after initial opening even when the zipper block is in the closed position to thereby indicate that initial opening has occurred and indicate that tampering with the opening of the bag may have occurred.

24. A multiwall bag as defined in claim 21, wherein the polymeric material comprises at least one of the following: polyethylene, polypropylene, nylon, ethylene vinyl acetate, ethylene vinyl alcohol, maleic anhydride grafted polyethylenes and propylenes, polyesters, and PTE to thereby enhance effectiveness of the heat seal and yet reducing risk of damage to the polymeric material.

25. A multiwall bag as defined in claim 16, wherein the at least one layer of polymeric material of the tube body comprises a first layer, wherein the at least one layer of paper material comprises a third layer, and wherein the tube body further comprises a second layer formed of a grease resistant material positioned between the first and third layers.

26. A multiwall bag as defined in claim 25, wherein the second layer of the tube body comprises at least one of the following materials: nylon, rubber, vinyl, and polymeric, wherein the at least one paper layer of the tube body comprises a plurality of paper layers, and wherein the tube body further comprises at least one grease resistant barrier associated with the plurality of paper layers, and wherein the at least one grease resistant barrier of the outer tube comprises at least one of the following: a grease resistant coating, a chemical applied to at least one of the plurality of paper layers, and a separate non-paper material layer.

27. A multiwall bag as defined in claim 16, wherein the bag seal zone comprises an adhesive seal positioned between the zipper block and outer surfaces of the tube body so that an inner surface of the polymeric material of the inner front wall region are adhesively sealed to the inner surface of the polymeric material of the inner back wall region so that when the bag is filled from the closed end, the adhesive seal enhances protection of the slider and zipper combination by operating as a stop region for the filling material.

28. A multiwall bag as defined in claim 27, wherein the adhesive seal allows the inner surfaces of the inner front wall and inner back wall regions to pealingly separate and unseal the inner surfaces of the inner front and back wall regions without substantial damage to the inner surfaces thereof when initially opening the bag through the zipper track.

29. A multiwall bag as defined in claim 16, wherein the tube body further has a plurality of gussets formed between the outer front wall region and the outer back wall region, at least a first one of the plurality of gussets being formed in a first region between the outer front and back wall regions so as to define a first outer side wall region and at least a second one of the plurality of gussets being formed in a second region between the outer front and back wall regions so as to define a second outer side wall region positioned opposite the first outer side wall region, and wherein the bag further comprises an adhesive material positioned adjacent the plurality of gussets so that when the heat seal is formed the adhesive material also is heated to thereby enhance sealing adjacent the gussets and thereby define a plurality of sealed gussets.

30. A multiwall bag as defined in claim 29, wherein each of the plurality of gussets has at least one less one ply of material in at least the first and second outer side walls than in the outer and inner front wall regions.

31. A multiwall bag as defined in claim 16, wherein the bag further includes an external reinforcement positioned to overlie the sealed gussets and to extend past the sealed gussets to cover regions of the front and back wall regions adjacent to the sealed gussets to thereby enhance the strength and stiffness of the sealed gussets and further reducing the risk of access to contents of the bag by a pest.

32. A multiwall bag as defined in claim 31, wherein the bag further includes a handle attached to the external reinforcement to provide easier handling of the bag.

33. A multiwall bag of tubular form comprising:
an inner tube having at least one layer of polymeric material including an inner front wall region and an inner back wall region positioned to face opposite the inner front wall region;
an outer tube having at least one layer of paper material and positioned to substantially surround outer surfaces of the inner tube, the outer tube having an open end region, a closed end region being initially in an open position, adapted to receive filling material therethrough, and then sealingly closed to a closed position, an outer front wall region positioned between the open end region and the closed end region, and an outer back wall region positioned between the open end region and the closed end region and positioned to face opposite the outer front wall region;
a fin member formed of a plastic material and connected to the outer front and back walls and extending substantially the entire lateral extent of and along the outer front and back wall regions, the fin member including at least a pair of spaced-apart elongate fin strips positioned to face opposite each other;
a zipper track connected to each of the pair of elongate fin strips of the fin member, the zipper track including a first track strip and a second track strip, the first and second track strips being adapted to be positioned between an open position defined by the first and second track strips being spaced apart to allow access to inner portions of the bag and a sealingly closed position defined by the first and second track strips abuttingly contacting each other to prevent ready access to the inner portions of the bag; and
a zipper block slidably connected to the zipper track to allow the zipper block to slidably move along the zipper track and move the first and second track strips between the open position and the closed position, the fin member, the zipper track, and the zipper block defining a slider zipper and fin combination.

34. A multiwall bag of claim 33, wherein the fin member is adhesively connected to the outer front and back walls and further including a layer of adhesive positioned between the outer front and back walls and the fin member so that the adhesive abuttingly contacts the outer front and back walls, the adhesive securely connecting the fin member top the outer front and back walls.

35. A multiwall bag as defined in claim 33, further comprising a pair of corner clips each connected to an opposite end of the zipper track and to the fin member to reduce the risk of damage to the zipper block, and wherein the combination of the inner tube and outer tube define a tube body of the bag.

36. A multiwall bag as defined in claim 33, wherein the polymeric material comprises at least one of the following: polyethylene, polypropylene, nylon, ethylene vinyl acetate, ethylene vinyl alcohol, maleic anhydride grafted polyethylenes and propylenes, polyesters, and PTE to thereby enhance effectiveness of the heat seal and yet reducing risk of damage to the polymeric material.

37. A multiwall bag as defined in claim 33, wherein the outer tube further has a plurality of gussets formed between the outer front wall region and the outer back wall region, at least a first one of the plurality of gussets being formed in a first region between the outer front and back wall regions so as to define a first outer side wall region and at least a second one of the plurality of gussets being formed in a second region between the outer front and back wall regions so as to define a second outer side wall region positioned opposite the first outer side wall region, and wherein the bag further comprises an adhesive material positioned adjacent the plurality of gussets to thereby define a plurality of sealed gussets to increase drop and abuse resistance of the bag, to reduce the risk of access to contents of a bag by a pest, and to reduce sifting of filling material when positioned in the bag.

38. A multiwall bag as defined in claim 37, wherein each of the plurality of gussets has at least one less one ply of material in at least the first and second outer side walls than in the outer and inner front wall regions.

39. A multiwall bag as defined in claim 37, wherein the bag further includes an external reinforcement positioned to overlie the sealed gussets and to extend past the sealed gussets to cover regions of the front and back wall regions adjacent to the sealed gussets to thereby enhance the strength and stiffness of the sealed gussets and further reducing the risk of access to contents of the bag by a pest.

40. A multiwall bag as defined in claim 39, wherein the bag further includes a handle attached to the external reinforcement to provide easier handling of the bag.

41. A multiwall bag of tubular form comprising:
an inner tube having at least one layer of polymeric material including an inner front wall region and an inner back wall region positioned to face opposite the inner front wall region;
an outer tube having at least one layer of paper material and positioned to substantially surround outer surfaces of the inner tube, the outer tube having an open end region, a closed end region being initially in an open position, adapted to receive filling material therethrough, and then sealingly closed to a closed position, an outer front wall region positioned between the open end region and the closed end region, and an outer back wall region positioned between the open end region and the closed end region and positioned to face opposite the outer front wall region;
a fin member formed of a plastic material and connected to the outer front and back walls and extending substantially the entire lateral extent of and along the outer front and back wall regions, the fin member including at least a pair of spaced-apart elongate fin strips positioned to face opposite each other;
a zipper track connected to each of the pair of elongate fin strips of the fin member, the zipper track including a first track strip and a second track strip, the first and second track strips being adapted to be positioned between an open position defined by the first and second track strips being spaced apart to allow access to inner portions of the bag and a sealingly closed position defined by the first and second track strips abuttingly contacting each other to prevent ready access to the inner portions of the bag;

a zipper block slidably connected to the zipper track to allow the zipper block to slidably move along the zipper track and move the first and second track strips between the open position and the closed position, the fin member, the zipper track, and the zipper block defining a slider zipper and fin combination;

a plurality of gussets formed between the outer front wall region and the outer back wall region, at least a first one of the plurality of gussets being formed in a first region between the outer front and back wall regions so as to define a first outer side wall region and at least a second one of the plurality of gussets being formed in a second region between the outer front and back wall regions so as to define a second outer side wall region positioned opposite the first outer side wall region, and wherein the bag further comprises an adhesive material positioned adjacent the plurality of gussets to thereby define a plurality of sealed gussets to increase drop and abuse resistance of the bag, to reduce the risk of access to contents of a bag by a pest, and to reduce sifting of filling material when positioned in the bag; and an external reinforcement positioned adjacent the open end of the outer tube and adapted to overlie and cover regions of the front and back wall regions adjacent to each of the sealed gussets to thereby enhance the strength and stiffness of each of the sealed gussets and further reduce the risk of access to contents of the bag by a pest.

42. A multiwall bag of claim 41, wherein the at least one layer of paper material of the outer tube comprises at least one layer of a polymeric material.

43. A multiwall bag as defined in claim 41, wherein the bag further includes a handle attached to the external reinforcement to provide easier handling of the bag.

44. A multiwall bag as defined in claim 41, wherein each of the plurality of gussets has at least one less one ply of material in at least the first and second outer side walls than in the outer and inner front wall regions.

45. A multiwall bag as defined in claim 41, further comprising a pair of corner clips each connected to an opposite end of the zipper track and to the fin member.

46. A multiwall bag of tubular form comprising:

an inner tube having at least one layer of polymeric material including an inner front wall region and an inner back wall region positioned to face opposite the inner front wall region;

an outer tube having at least one layer of paper material and positioned to substantially surround outer surfaces of the inner tube, the outer tube having an open end region, a closed end region being initially in an open position, adapted to receive filling material therethrough, and then sealingly closed to a closed position, an outer front wall region positioned between the open end region and the closed end region, and an outer back wall region positioned between the open end region and the closed end region and positioned to face opposite the outer front wall region;

a plurality of gussets formed between the outer front wall region and the outer back wall region, at least a first one of the plurality of gussets being formed in a first region between the outer front and back wall regions so as to define a first outer side wall region and at least a second one of the plurality of gussets being formed in a second region between the outer front and back wall regions so as to define a second outer side wall region positioned opposite the first outer side wall region, and wherein the bag further comprises an adhesive material positioned adjacent the plurality of gussets to thereby define a plurality of sealed gussets to increase drop and abuse resistance of the bag, to reduce the risk of access to contents of a bag by a pest, and to reduce sifting of filling material when positioned in the bag; and an external reinforcement positioned adjacent the open end of the outer tube and adapted to overlie and cover regions of the front and back wall regions adjacent to each of the sealed gussets to thereby enhance the strength and stiffness of each of the sealed gussets and further reduce the risk of access to contents of the bag by a pest.

47. A multiwall bag as defined in claim 46, wherein the bag further includes a handle attached to the external reinforcement to provide easier handling of the bag.

48. A multiwall bag of claim 46, wherein the at least one layer of paper material of the outer tube comprises at least one layer of a polymeric material.

49. A multiwall bag as defined in claim 46, further comprising a pair of corner clips each connected to an opposite end of the zipper track and to the fin member.

50. A multiwall bag as defined in claim 46, wherein each of the plurality of gussets has at least one less one ply of material in at least the first and second outer side walls than in the outer and inner front wall regions.

* * * * *

(12) INTER PARTES REEXAMINATION CERTIFICATE (981st)
United States Patent
Hartzell et al.

(10) Number: US 7,090,904 C1
(45) Certificate Issued: *Oct. 29, 2014

(54) ENHANCED SLIDER ZIPPER MULTIWALL BAG AND ASSOCIATED METHODS

(75) Inventors: Mark Hartzell, Bloomsburg, PA (US); Alfred A. McLellan, Inman, SC (US); Sarajane Johnson, Simpsonville, SC (US); Roseann Woodham-Grant, Greenville, SC (US); Lesley M. Millslagle, Roebuck, SC (US); Mary K. Cash, Wellford, SC (US)

(73) Assignee: Bank of America, N.A., Charlotte, NC (US)

Reexamination Request:
No. 95/001,638, Jun. 2, 2011

Reexamination Certificate for:
Patent No.: 7,090,904
Issued: Aug. 15, 2006
Appl. No.: 10/860,366
Filed: Jun. 3, 2004

( * ) Notice: This patent is subject to a terminal disclaimer.

Related U.S. Application Data

(63) Continuation-in-part of application No. 10/290,681, filed on Nov. 8, 2002, now Pat. No. 6,979,482.

(51) Int. Cl.
*B29D 22/00* (2006.01)
*B29D 23/00* (2006.01)
*B32B 1/08* (2006.01)

(52) U.S. Cl.
USPC ..... 428/34.3; 428/35.7; 428/36.91; 383/61.2; 383/61.3; 383/120

(58) Field of Classification Search
None
See application file for complete search history.

(56) References Cited

To view the complete listing of prior art documents cited during the proceeding for Reexamination Control Number 95/001,638, please refer to the USPTO's public Patent Application Information Retrieval (PAIR) system under the Display References tab.

*Primary Examiner* — Jeffrey L. Gellner

(57) ABSTRACT

A multiwall bag having a slider zipper and fin combination and methods of forming same are provided. The multiwall bag, for example, can include a tube body. A combination fin member, zipper track, and zipper block can be connected to an end of the tube body. The other end of the tube body can be filled with product so that the combination fin member, zipper track, and zipper block operate as a constructive bottom during filling. Then, the end of the tube body through which product is filled can be closed and sealed to provide a bag filled with product. The method can include forming a tube body and connecting a combination fin member, zipper track, and zipper block to the bag seal zone.

**Attention is directed to the decision of *Exopack-Tech. LLC v. Graphic Packaging Holding Co. et al.*, 7:11cv337 (S.C. filed:2/09/2011) relating to this patent. This reexamination may not have resolved all questions raised by this decision. See 37 CFR 1.552(c) for *ex parte* reexamination and 37 CFR 1.906(c) for *inter partes* reexamination.**

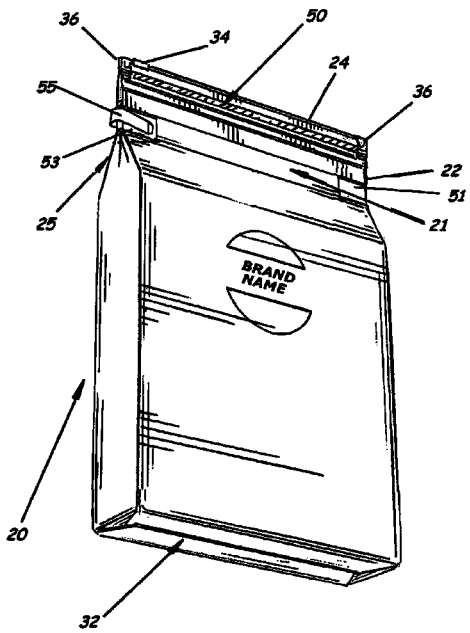

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

The patentability of claims 16-29 is confirmed.
Claims 33-37 are cancelled.
Claims 1-15, 30-32 and 38-50 were not reexamined.

* * * * *